United States Patent [19]

Förster

[11] Patent Number: 5,551,541
[45] Date of Patent: Sep. 3, 1996

[54] SHOCK ABSORBER

[75] Inventor: Andreas Förster, Schweinfurt, Germany

[73] Assignee: Fichtel & Sachs AG, Schweinfurt, Germany

[21] Appl. No.: 214,615

[22] Filed: Mar. 17, 1994

[30] Foreign Application Priority Data

| Mar. 18, 1993 | [DE] | Germany | 43 08 603.9 |
| Feb. 26, 1994 | [DE] | Germany | 44 06 373.3 |
| Mar. 3, 1994 | [DE] | Germany | 44 06 918.9 |

[51] Int. Cl.⁶ ............................................. F16F 9/46
[52] U.S. Cl. ...................... 188/317; 188/315; 188/322.15
[58] Field of Search ........................ 188/317, 316, 188/320, 319, 322.15, 299, 311, 313, 314, 315

[56] References Cited

U.S. PATENT DOCUMENTS

| 4,732,408 | 3/1988 | Öhlin | 188/322.15 X |
| 4,893,699 | 1/1990 | Engelsdorf et al. | 188/322.15 X |
| 5,044,474 | 9/1991 | de Kock | 188/322.15 X |
| 5,152,379 | 10/1992 | Sackett et al. | |
| 5,303,804 | 4/1994 | Spiess | 188/322.15 X |

FOREIGN PATENT DOCUMENTS

| 0200446 | 11/1986 | European Pat. Off. . |
| 0400395 | 12/1990 | European Pat. Off. . |
| 0572040 | 12/1993 | European Pat. Off. . |
| 0608427 | 8/1994 | European Pat. Off. . |
| 2282071 | 3/1976 | France . |
| 4016807 | 1/1991 | Germany . |
| 4219141 | 12/1992 | Germany . |
| 4118030 | 12/1992 | Germany . |
| 4406918 | 9/1994 | Germany . |
| 2257231 | 1/1993 | United Kingdom . |

Primary Examiner—Robert L. Oberleitner
Assistant Examiner—Peter M. Poon
Attorney, Agent, or Firm—Nils H. Ljungman & Associates

[57] ABSTRACT

Shock absorber with adjustable damping force, comprising a pressure tube filled with damping medium, in which a piston on an axially movable piston rod divides a work chamber into a piston-side and a non piston-side chamber, whereby there is a damping medium flow between the two work chambers, which is divided into a main flow and a bypass flow, a damping valve device consisting of a damping valve body, with a main stage valve for each flow direction, each of which is formed by a main stage valve body, and a pilot stage valve which activates the main stage valve, an adjustable actuator, which controls a flow connection between the control chamber and a work chamber, whereby the control chamber is limited axially by the first and second spring-loaded main stage valve bodies, whereby the first main stage valve body, during the inflow from the closed valve position into an open position, is moved axially into the control chamber toward the second main stage valve body, which is held in the closed valve position by the damping medium, and when the inflow is in the reverse direction, the second main stage valve body is moved out of the closed valve position into an open position, axially toward the first main valve stage body which is in the closed valve position.

18 Claims, 20 Drawing Sheets

SHOCK ABSORBER

BACKGROUND OF THE INVENTION

1. Field of the Invention

The present invention generally relates to a shock absorber with adjustable damping force, comprising a pressure tube filled with damping medium, in which a piston on an axially movable piston rod divides a work chamber into a piston-side chamber and a non piston-side chamber, whereby there is a damping medium flow between the two work chambers, which is divided into a main flow and a bypass flow, a damping valve device consisting of a damping valve body, with a main stage valve for each flow direction, each of which is formed by a main stage valve body, and a pilot stage valve which activates the main stage valve, an adjustable actuator, which controls a flow connection between the control chamber and a work chamber.

2. Background Information

German Laid Open Patent Application No. 41 18 030 discloses a shock absorber which is equipped with a damping valve device which is formed by a main stage valve and a pilot stage valve. The pilot stage valve for each flow direction essentially consists of a dummy piston, possibly a balance piston, which can move axially inside a pilot chamber. The dummy piston is displaced by the pressure force of the damping medium, whereby the motion of the two dummy pistons under the influence of the damping medium takes place simultaneously and in the same direction of movement. In other words, during the influx, the dummy piston facing the work chamber to be reduced in size is moved into the pilot chamber, and the other dummy piston is moved out of it. Such a configuration tends to require an increased amount of axial space for the damping valve device. Overall, the size of the valve device is a significant disadvantage.

An additional disadvantage of this valve design is that leak currents from the pilot chamber have a significant effect on the opening action of the main stage valve. The diaphragm gland between the connecting pipes, or tubes, of the valve device and the two dummy pistons, as well as the leakage losses between the slide valve and the tube, tend to add up. These leakage losses are predominantly a function of the tolerances of the components in question. Consequently, the opening action of the main valve stage is indirectly a function of the leakage losses.

OBJECT OF THE INVENTION

The object of the present invention is to realize a compact damping valve apparatus which has a simple structure and an operating action independent of the leakage losses.

SUMMARY OF THE INVENTION

The present invention teaches that the above object can be achieved by the fact that the control chamber is preferably limited axially by the first and second spring-loaded main stage valve bodies, whereby the first main stage valve body, during the inflow from the closed valve position into an open position, is preferably moved axially into the control chamber toward the second main stage valve body, which is held in the closed valve position by the damping medium, and when the inflow is in the reverse direction, the second main stage valve body is preferably moved out of the closed valve position into an open position, axially toward the first main valve stage body in the closed valve position.

Compared to the known device described further above, the axial space required for the damping valve apparatus according to the present invention is reduced significantly. The size and number of the parts required can be reduced as a result of the functional connection between the main stage valve bodies and the limitation of the control chamber.

In one variant realization of the present invention, the main stage valve is flowed through by the main current and the pilot stage valve by the bypass current in both directions of flow. Non- return valves, which generally require a significant amount of installation space, are generally unnecessary. The bi-directional flow capability tends to reduce the danger of fouling inside the damping valve device. The number of moving parts is also reduced, which also results in a cost reduction.

The present invention also teaches that inside the damping valve body, the bypass flow of the damping medium runs through the control chamber, and the main flow through connecting passages radially outside the control chamber, and that an antechamber formed by the actuator is oriented concentric to the control chamber, whereby there is a connection between the antechamber and the work chamber in at least one direction of flow, and thus there is a radial flow connection which is influenced by the actuator, between the control chamber and the antechamber. As a result, leaks have practically no effect. At the same time, the radial configuration of the damping valve chambers and of the connecting passages guarantees that even large volume flows of the main stage can be realized. The flow paths of the bypass flow are preferably kept short, so that any possible dirt cannot adversely affect operation.

To realize the radial space required and to achieve large flow cross sections inside the damping valve device, there is preferably a joint inflow opening, or joint afflux opening, inside the damping valve body, at least in one flow direction, for the main flow and the bypass flow.

To change the damping force adjustment for both flow directions of the damping valve device in the same direction, i.e. to make the damping force uniformly harder or softer for the decompression and compression direction, the damping valve device is preferably equipped with non-return valves for the main flow and/or the bypass flow so that for both flow directions of the control chamber, the damping force is adjusted by controlling the discharge of the bypass flow between the control chamber and the antechamber.

In an alternative configuration of the invention, the damping valve device can preferably be equipped with non-return valves for the main flow and/or the bypass flow, so that for one flow direction of the control chamber, the damping force is adjusted by controlling the feed, and for the other flow direction by controlling the discharge of the bypass flow between the control chamber and the antechamber. This configuration can be used wherever an adjustable damping force is also used to achieve a levelling of a vehicle. If the damping is set harder for one flow direction, the opposite damping direction simultaneously becomes softer.

Advantageously, as disclosed hereinbelow, the main stage valve body can preferably have throttle holes, through which the bypass flow can flow into the control chamber. The holes to the control chambers or to the pilot chamber can also preferably have transmission valves, which preferably act as a function of the direction, and which preferably release a larger throttle cross section in the outflow direction of the respective spaces than in the inflow direction. As a result of this advantageous measure, the bandwidth of the advance opening can preferably be greater, since the ratio of the inflow cross section to the outflow cross section is generally considered to be an indicator of the spread of the pilot control.

Preferably, the main stage valve bodies can be advantageously equipped with non-return valves which open in the inflow direction of the bypass flow into the control chamber. Thus, in turn, the flow path of the bypass flow will essentially be shortened or simplified, to eliminate the convoluted flow path of known devices. In one variant realization, at least one of the non-return valves can be formed by an elastically-deformable retaining ring. The latter is preferably manufactured from plastic or rubber, as a function of the expected pressure level in the shock absorber, and at high pressures can be designed as a slotted metal ring.

The main stage valves can also advantageously have a directionally-dependent damping force characteristic, which is formed by several springs, whereby all of the springs would preferably be braced against one main stage valve body, and some of the springs would be engaged on the other main stage valve body, so that the spring forces for one valve body would add up, and that only some of the spring force is exerted on the other main stage valve body. The springs can be arranged concentrically inside the control chamber. Essentially no additional space is required for the springs. Alternatively, the directionally-dependent damping force characteristics can be realized by means of numerous springs, in which one of the springs is braced against one main stage valve body, and a corresponding spring is braced on the other main stage valve body, whereby both springs are preferably engaged alternately, or reciprocally, on a spring guide which is stationary relative to the damping valve intermediate housing. The advantage of this configuration is that the spring forces do not alternately affect the main stage valves, so that an independent damping force design for the two flow directions is possible.

To prevent undesirable spring force peaks, the damping valve device preferably has at least one pressure relief valve. With an unclosed advance opening cross section, the damping valve is preferably adjusted automatically, and thereby forms a pressure relief valve. One advantageous feature of the invention is that the non-return valves for the main flows can preferably be provided with pressure relief valves.

In one advantageous variant embodiment, the non-return valve for the main flow preferably consists of a non-return valve body prestressed by a spring against the damping valve body, with a connection cross section to both sides of the valve body, which in turn is preferably covered by a spring-loaded closing body, or closer, so that in one flow direction of the main flow, the closing body preferably lifts up from the damping valve body, and that in the other direction, the non-return valve body preferably lifts up from the damping valve body. If space is available, it is also advantageously possible to equip the non-return valves for the bypass flows with pressure relief valves. The flow cross sections of the non-return valves can be very small, and can still be fully effective.

In one embodiment, the pressure control valve for the bypass flow can be advantageously located inside the control chamber, whereby the pressure control valve and the non-return valve are preferably designed as a combination component, and as two discs braced against one another, which alternately lift up from their valve seat surfaces.

To simplify the main valve body, the main valve body can conceivably consist of two individual bodies, whereby the one represents the guide body and the other the seat body.

Instead of, or in combination with, a pressure control valve, the pilot stage valve can advantageously be always partly open, so that the main stage valve simultaneously represents a pressure relief valve. For that purpose, the hydraulically effective valve opening surfaces of the main stage valve body are preferably advantageously larger than the valve closing surfaces.

The actuator in one embodiment preferably includes a servomotor connected to a rotary valve. This variant is characterized by a very large bypass flow cross section.

Alternatively, the actuator can preferably include a ring magnet in connection with an axially-movable armature. This version is particularly attractive if the opening position of the actuator is required to control the damping force, since the actuator current is proportional to the regulating distance of the armature.

To reduce the danger of fouling, and related risks, to proper operation, the movable armature is preferably designed as a seat valve. Preferably, there is advantageously a connecting rod inside the armature, which preferably has a crown on at least one end, and preferably forms an angle offset equalization with a matching opposite surface. The actuator is preferably continuously adjustable, to achieve the largest possible family of characteristics with the damping valve device.

If, on the other hand, only certain specified damping force characteristics are to be realized by the damping force device, then the actuator used can preferably be adjusted in discrete stages. Using the stepped actuator, inside the damping force device, the tolerances of the connecting path between the control chamber and the antechamber can be greater.

A particularly advantageous damping valve device preferably has two separate control chambers, whereby there is one control chamber for each flow direction, and the connections between the control chambers and the antechamber can be controlled by a joint actuator. In this respect, there may preferably be a total of two basic setting ranges of the damping devices, whereby the one produces a damping force adjustment in the same direction for both flow directions. This configuration of a damping force device combines a conventional adjustment of the damping force, in which the damping force is increased or decreased uniformly for both flow directions, with an adjustment in which the damping force for one flow direction is increased and the damping force for the other flow direction is simultaneously decreased, and vice-versa. A conventional and a "skyhook" family of characteristics can thus be advantageously realized in a single damping valve device.

For the same application, a damping device can be used which has two separate control chambers, whereby for each flow direction, the flow travels through one control chamber, and the connections between the control chamber and the antechamber are preferably controlled by a common actuator, so that for each flow direction, there are at least two different damping force characteristics which can be set in the same directions or in alternative directions as a function of the actuator position. The number of damping force characteristics is essentially determined by the number of connections which can be controlled.

If, in an additional advantageous configuration, the connection between the antechamber and the control chamber represents the advanced opening cross section, the damping force characteristic can be configured to suit the application. In particular with low flow velocities and a soft damping force setting, a larger advanced opening cross section results in a better response of the shock absorber.

To reduce the number of parts required, the damping valve housing preferably consists of a terminal damping valve head body and a damping valve intermediate body. In a logical refinement of this characteristic, the damping valve head bodies are preferably oriented symmetrically inside the damping valve housing.

The damping valve housing, with its "stratified" construction, essentially affects the prestressing of the springs which apply pressure to the main valve stage bodies, so that there can be fluctuations of the damping forces. To offset this error, the invention advantageously provides that there is a jacket tube oriented concentrically to the damping valve intermediate body, and at least one damping valve head body can be displaced relative to the jacket tube before it is fixed to the jacket tube, so that the axial length of the damping valve intermediate body can be adjusted arbitrarily. Generally, the length of the damping valve intermediate body is the primary cause for damping force variances. By upsetting the damping force intermediate body by means of at least one damping valve head body, the length tolerance can be essentially equalized. The corresponding elasticity of the damping valve intermediate body can be achieved very simply by manufacturing the damping valve intermediate body of aluminum, for example, The invention teaches that the fastening between the damping valve intermediate body and the jacket tube is accomplished by means of a plastic deformation, e.g. hammering the edge, but other known connections can also be used.

The damping valve block bodies and the damping valve intermediate bodies can also preferably be combined into a single unit, so that the damping valve housing consists essentially of only two components.

The main stage valves are preferably advantageously centered on a pivot segment, or rod segment, corresponding to the piston rod. This centering preferably has a seal which reduces leaks to a negligible amount. In contrast to the known device described further above, the tolerance essentially needs to be tighter only on the inside diameter. The outside diameter of the main valve body essentially plays no role at all for the leaks, since it does not need to perform any sealing function.

If the magnetic coil of the actuator should ever lose its power supply, advantageously, the damping valve device preferably has an emergency operating position which essentially consists of a spring system which presses the armature of the actuator against a contact surface, so that a medium damping force setting is connected.

To reduce the actuator forces and the corresponding power requirement, the actuator preferably has, advantageously, a pressure-equalizing actuator element.

One variant realization of the invention has a two-part control chamber, whereby the two parts of the control chamber are connected by the pilot valve. The inflow can also arrive via connecting holes outside the main stage valve bodies. The main stage valve body as an individual component can thereby be simplified.

In summary, one aspect of the invention resides broadly in a shock absorber comprising: a cylinder defining a chamber therein, the cylinder containing a damping fluid; a piston rod sealingly projecting into the cylinder and being axially displaceable with respect to the cylinder; a piston being attached to the piston rod, the piston being slidably disposed within the cylinder to sealingly divide the cylinder into first and second chambers; means for permitting fluid communication between the first and second chambers; the means for permitting fluid communication being disposed in at least a portion of the piston, the means for permitting fluid communication comprising: a first spring-loaded main stage valve body; a second spring-loaded main stage valve body; a control chamber being defined between the first main stage valve body and the second main stage valve body; first inlet means for directing fluid from the first chamber to the control chamber through the first main stage valve body upon axial displacement of the piston in a first direction; second inlet means for directing fluid from the second chamber to the control chamber through the second main stage valve body upon axial displacement of the piston in a second direction, the second direction being opposite the first direction; means for permitting axial displacement of the first main stage valve body towards the second main stage valve body during flow of damping fluid through the first inlet means; and means for permitting axial displacement of the second main stage valve body towards the first means stage valve body during flow of damping fluid through the second inlet means.

Another aspect of the invention resides broadly in a method of operating a shock absorber, the shock absorber comprising: a cylinder defining a chamber therein, the cylinder containing a damping fluid; a piston rod sealingly projecting into the cylinder and being axially displaceable with respect to the cylinder; a piston being attached to the piston rod, the piston being slidably disposed within the cylinder to sealingly divide the cylinder into first and second chambers; the method comprising the steps of: providing means for permitting fluid communication between the first and second chambers; disposing the means for permitting fluid communication in at least a portion of the piston; the step of providing the means for permitting fluid communication comprising the steps of: providing a first spring-loaded main stage valve body; providing a second spring-loaded main stage valve body; defining a control chamber being between the first main stage valve body and the second main stage valve body; providing first inlet means for directing fluid from the first chamber to the control chamber through the first main stage valve body upon axial displacement of the piston in a first direction; providing second inlet means for directing fluid from the second chamber to the control chamber through the second main stage valve body upon axial displacement of the piston in a second direction, the second direction being opposite the first direction; providing means for permitting axial displacement of the first main stage valve body towards the second main stage valve body during flow of damping fluid through the first inlet means; and providing means for permitting axial displacement of the second main stage valve body towards the first means stage valve body during flow of damping fluid through the second inlet means; the method further comprising the additional steps of: displacing the piston in the first direction; performing the following steps during displacement of the piston in the first direction: directing fluid, with the first inlet means, from the first chamber to the control chamber through the first main stage valve body; and axially displacing the first main stage valve body towards the second main stage valve body; displacing the piston in the second direction; and performing the following steps during displacement of the piston in the second direction: directing fluid, with the second inlet means, from the second chamber to the control chamber through the second main stage valve body; and axially displacing the second main stage valve body towards the first main stage valve body.

BRIEF DESCRIPTION OF THE DRAWINGS

The invention is explained in greater detail below with reference to the accompanying figures, wherein:

FIG. 1a-2 is essentially the same view as FIG. 1a-1, but more detailed;

FIG. 2 shows a damping valve device with ring magnet and armature;

DESCRIPTION OF THE PREFERRED EMBODIMENT

Figures 1, 1A:
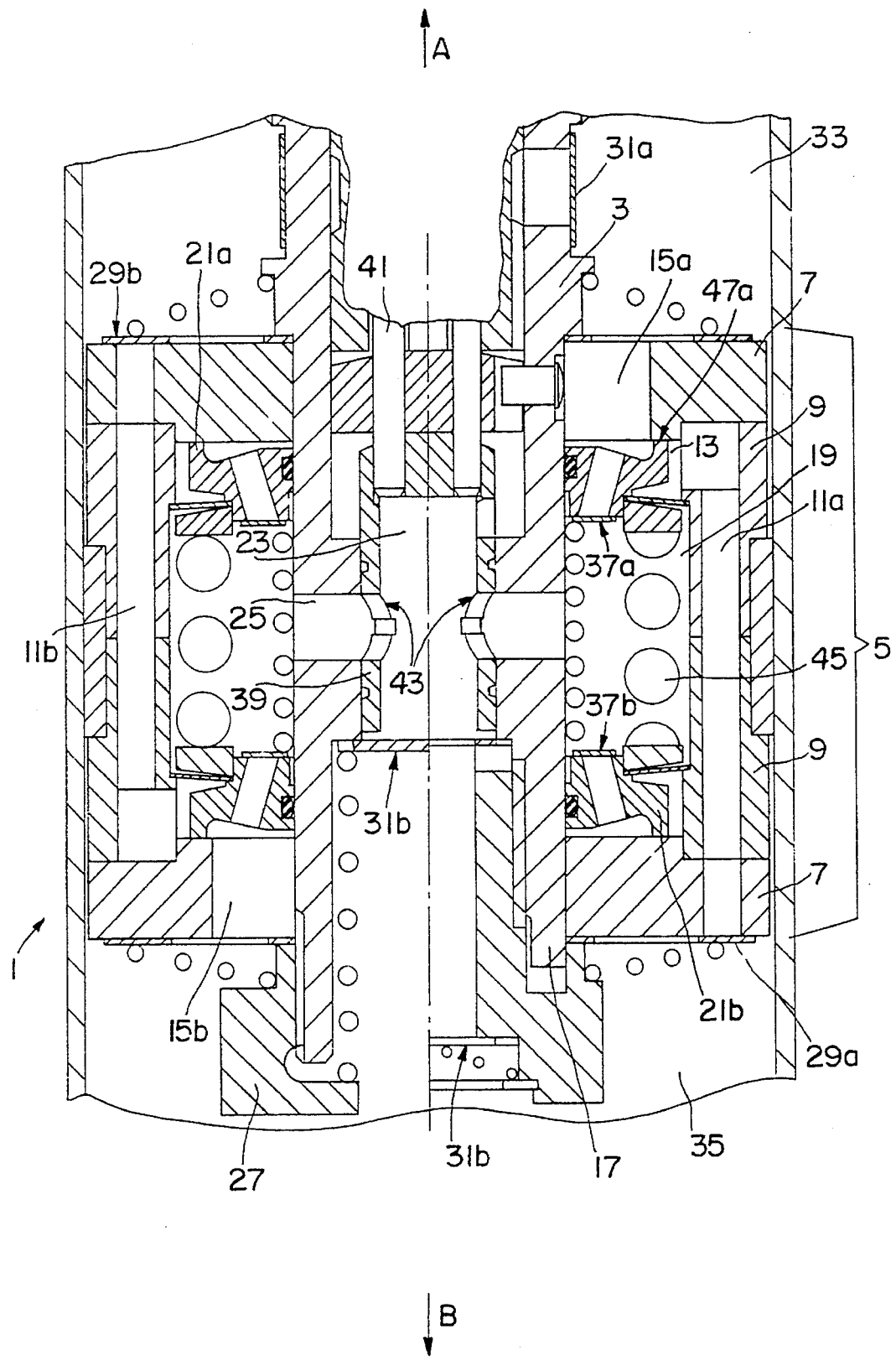
FIG. 1a-1 shows a damping valve device with rotary valve actuator.

FIG. 1a–1 is restricted to an illustration of a damping valve device 1 on a hollow piston rod 3. The damping valve device 1 preferably comprises, among other things, a damping valve housing 5, which in turn has, on each end, a damping valve body 7 and two damping valve intermediate bodies 9. The two damping valve intermediate bodies 9 are preferably identical, but are preferably oriented symmetrically, so that holes form connecting passages 11a/b. Connecting passages 11a/b preferably have radial connections as the feed 13 to the influx openings 15a/b. Radially farther inside, in relation to the connecting passages, a pivot segment, or rod segment, 17 of the piston rod 3 preferably delimits, along with the damping valve intermediate body 9, a control chamber 19. Control chamber 19 is preferably axially defined on each end by main stage valve bodies 21a/b. Coaxial to the control chamber 19, there is preferably an antechamber 23 which is connected by means of radial flow connections 25 to the control chamber 19. The entire damping valve device 1 is preferably braced on the piston rod 3 by means of a nut 27.

Pivot segment, or rod segment, 17, as described herein, should generally be taken to be indicative of a hollow rod portion, generally cylindrical in shape, which is preferably generally coaxial with respect to piston rod 3. In at least one embodiment of the present invention, pivot segment 17 may essentially correspond to a terminal portion of piston rod 3.

The damping valve device 1 preferably has a series of non-return valves which control the flow conditions inside the damping valve device 1. On one hand, the exit openings of the connecting passages 11a/b preferably have non-return valves 29a, 29b. On the other hand, the non-return valves 31a/31b which block off the antechamber 23 from the adjacent work chamber 33/35 are preferably located on or in the piston rod 3. Finally, each main stage valve body 21a/b is preferably equipped with a non-return valve 37a/37b, which permits only the influx to the control chamber 19.

Inside the antechamber 23 there is a rotary valve 39, which is connected by means of control rods 41 to a torque motor (not shown). The rotary valve 39 has flow cross sections 43 which control a connection between antechamber 23 and the control chamber 19 via the radial flow connections 25.

When the damping valve device 1 moves in the direction A, the damping medium must be displaced, whereupon the damping medium preferably flows into the influx opening 15a. Inside the influx opening 15a, the medium is preferably divided into a main flow and a bypass flow. The bypass flow preferably flows through the main stage valve body 21a and the non-return valve 37a into the control chamber 19. As a function of the flow cross section 43, a pressure preferably builds up in the control chamber 19, and this pressure preferably exerts a closing force on the main stage valve body 21a. This closing force is preferably superimposed upon by the force of a closing spring 45. Preferably, if the opening force in the vicinity of the influx opening 15a is greater than the closing force of the control chamber 19, the main stage valve body 21a lifts up from a valve seat 47a, whereupon the feed 13 to the connecting passages 11a is opened. The non-return valve 31a preferably closes the work chamber 33 from the antechamber 23, so that the system pressure in the work chamber 33 cannot affect the closing force in the control chamber 19.

The discharge from the control chamber 19 preferably takes place via the non-return valve 31b which, as shown in the left half of FIG. 1a–1, can be next to the rotary valve 39 or, as shown in the right half of FIG. 1a–1, can alternatively be located at the outflow opening from the piston rod pivot segment 17.

During the stroke movement described above, the non-return valve 29b preferably closes the connecting passages 11b, so that the system pressure cannot flow into the control chamber 19.

When there is a stroke movement in the direction B, the non-return valves 29a and 31b preferably close. The damping medium preferably passes the non-return valve 37b and the closing force preferably accumulates, or increases, for the main stage valve body 21a. The bypass flow is preferably discharged via the control chamber 19. After the lifting of the main stage valve body 21b which, like the main stage valve body 21a, is centered on the pivot segment 17, the main flow preferably flows in connecting passages 11b.

Essentially, the damping force is indirectly determined by the size of the passage cross section 43, whereby for both flow directions, the discharge from the control chamber 19 can be used to change the damping force. Consequently, a change of the passage cross section 43 basically acts in the same direction, so that, essentially, for the decompression and compression direction, there are identical changes toward harder or softer damping force settings. Thus the passage cross section 43, in connection with the main valve body, essentially performs a pressure relief function, since the passage cross section is essentially never altogether closed, and the main valve body 21 can lift up in the event of pressure peaks.

With regard to the actuator, it should also be noted that the rotary valve 39 is preferably designed in a pressure-equalized manner to minimize the energy expenditure. The flow cross section 43, which simultaneously represents the advanced opening cross section, is preferably always partly open. The result is a pressure limiting action, since the discharge from the control chamber 19 can essentially never be blocked. Utilizing the flow cross section 43 as the advanced opening cross section can preferably advantageously change the characteristic of the damping valve device 1, since the flow cross section 43 is preferably opened to the maximum for the "soft" damping force setting. Simultaneously, the advanced opening cross section is particularly large, so that the shock absorber has a very soft and comfortable response.

The radial arrangement of the control chamber 19 in relation to the antechamber 23 in connection with the connecting passages 11a and 11b essentially results in a very short damping valve device 1, which also includes short flow paths. This takes into account the fact that the currents with the lowest volumes are placed centrally, and the main flow radially to the outside on a large arc, to achieve the greatest possible flow. The uniformity of the parts, e.g. of the main stage valve bodies 21a/21b or of the damping valve bodies 7 and 9, significantly reduces the manufacturing expense.

Figures 1, 1A, 2:
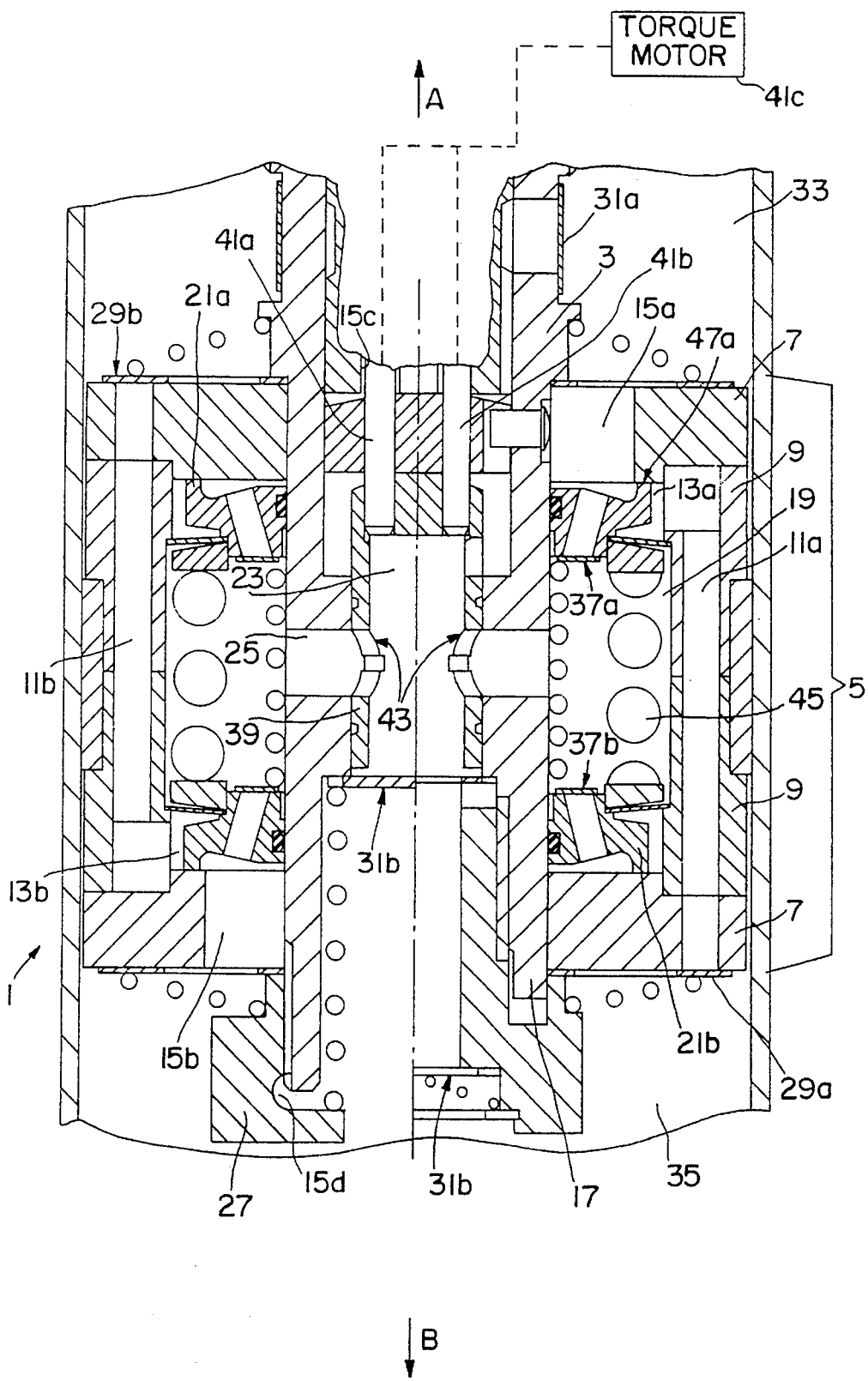

FIG. 1a–2 is substantially the same view as FIG. 1a–1, but more detailed. As shown in FIG. 1a–2, according to one embodiment of the present invention, flow into chamber 15a may take place via passage 15c and flow into chamber 15b may take place via passage 15d. Of course, other arrangements of passages for directing flow into chambers 15a and 15b may be utilized in accordance with the embodiments of the present invention.

Also, as shown in FIG. 1a–2, according to a preferred embodiment of the present invention, a torque motor 41c may preferably be provided to displace control rods 41a and 41b in a generally circular path about the longitudinal axis of piston rod 3 to transfer a rotational force to rotary valve 39 to control the cross-section of openings 43. Torque motor 41c, as such, will preferably be connected to control rods 41a and 41b in such a manner as to best facilitate such a transfer of rotational force.

Figure 1B:
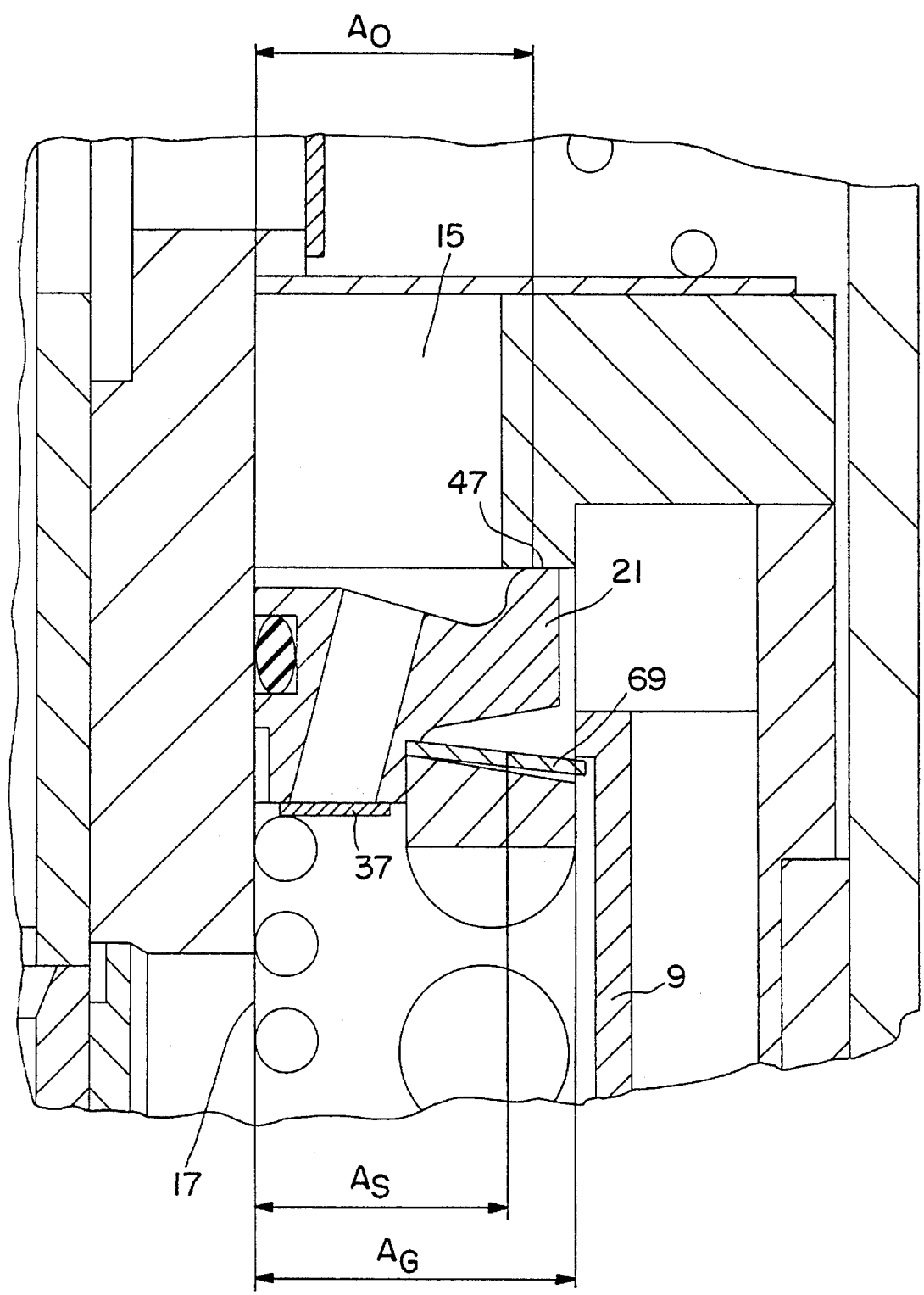
FIG. 1b is a detail of the main valve body area.
Figure 2:
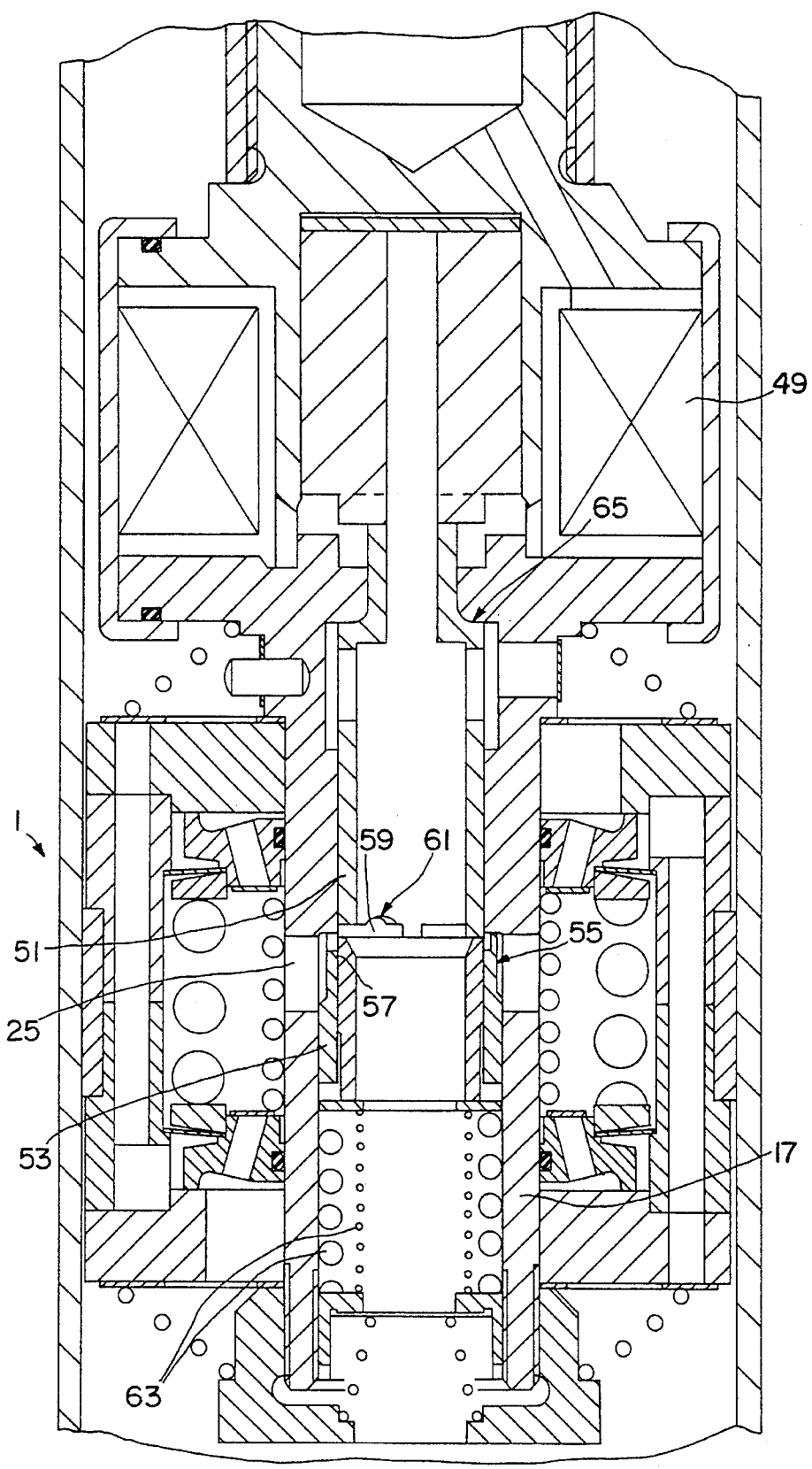

FIG. 1b shows a greatly-enlarged detail of FIG. 1a–1 in the vicinity of the main stage valve body 21. The effect of the main stage valve body 21 in connection with an always partly open advanced opening cross section 43 essentially results from an area ratio between the control-chamber-side and the inflow-opening-side hydraulic active areas (Ao/As). The valve-opening surface area Ao essentially results from the circular ring of the main stage valve body 21, whereby the inside diameter of the valve seat 47 represents the outside diameter of the circular ring surface Ao. The hydraulically pressurized surface Ag is essentially formed by the control-chamber-side surface of the main stage valve body 21 and the spring plate 69. The spring plate 69 is essentially supported on the housing 9 and on the main stage valve body 21. Consequently, essentially one-half of the hydraulic closing force acts on the housing 9 and the other half on the main stage valve body 21a. The valve-closing hydraulically pressurized active area thus essentially consists of the sum of the areas of the control chamber side main stage valve body and one-half of the effective surface area of the spring plate. For the pressure control effect, it is highly desirable that the valve-opening surfaces be larger than the valve-closing surfaces. Consequently, when there is equal pressure in the control chamber 19 and in a shrinking work chamber, the hydraulic opening forces are essentially greater than the valve-closing forces. Thus, for the design of the closing springs, above a defined operating pressure in the shock absorber, the hydraulic pressure which acts on the differential area between the valve-opening and the valve-closing surfaces is preferably essentially greater than the force of the closing spring.

FIG. 2 illustrates essentially the same structure as FIGS. 1a and 1b. In the embodiment of FIG. 2, however, there are differences in the actuator, which, in FIG. 2, preferably consists of a ring magnet 49 in connection with an axially movable armature 51, the armature 59 being located so that it can slide inside the pivot segment 17. The radial flow connection 25 preferably has a sleeve 53 with a collecting extension 55, which in turn preferably has notches 57, which together with holes, or recesses, 59 form the advanced opening cross section. The collecting extension 55 preferably leads the damping medium out of the control chamber to the advanced opening cross section. For precise control, the recesses 59 preferably have additional moldings 61 which can be configured as necessary, to realize a desired cross section area, as a function of the stroke length of the armature 51.

Thus, in accordance with a preferred embodiment of the present invention, as shown in FIG. 2, the advanced opening cross section can preferably be formed by notches 57 in conjunction with recesses 59. As shown, notches 57 and recesses 59 are preferably configured such that, upon axial displacement of armature 51, the notches 57 and recesses 59 will either interface to a given degree so as to produce a given advanced opening cross section, or be disposed separately from one another so as to essentially close the passage formed therebetween.

As a fail-safe device, in the event that power to the ring magnet 49 is lost, there can preferably be a pair of coil springs 63 on the outlet opening of the pivot segment 17 braced against the armature 51. The springs 63 preferably have a slightly different length, and preferably differ significantly in terms of their spring constants, whereby the longer spring 63 preferably has the lower spring constant. When the power to the magnetic coil 49 fails, the longer spring is preferably configured to push the armature 51 against a contact surface 65. In this position, the advanced opening cross section is preferably set to an intermediate value, so that a medium damping force characteristic is realized.

Figure 3:
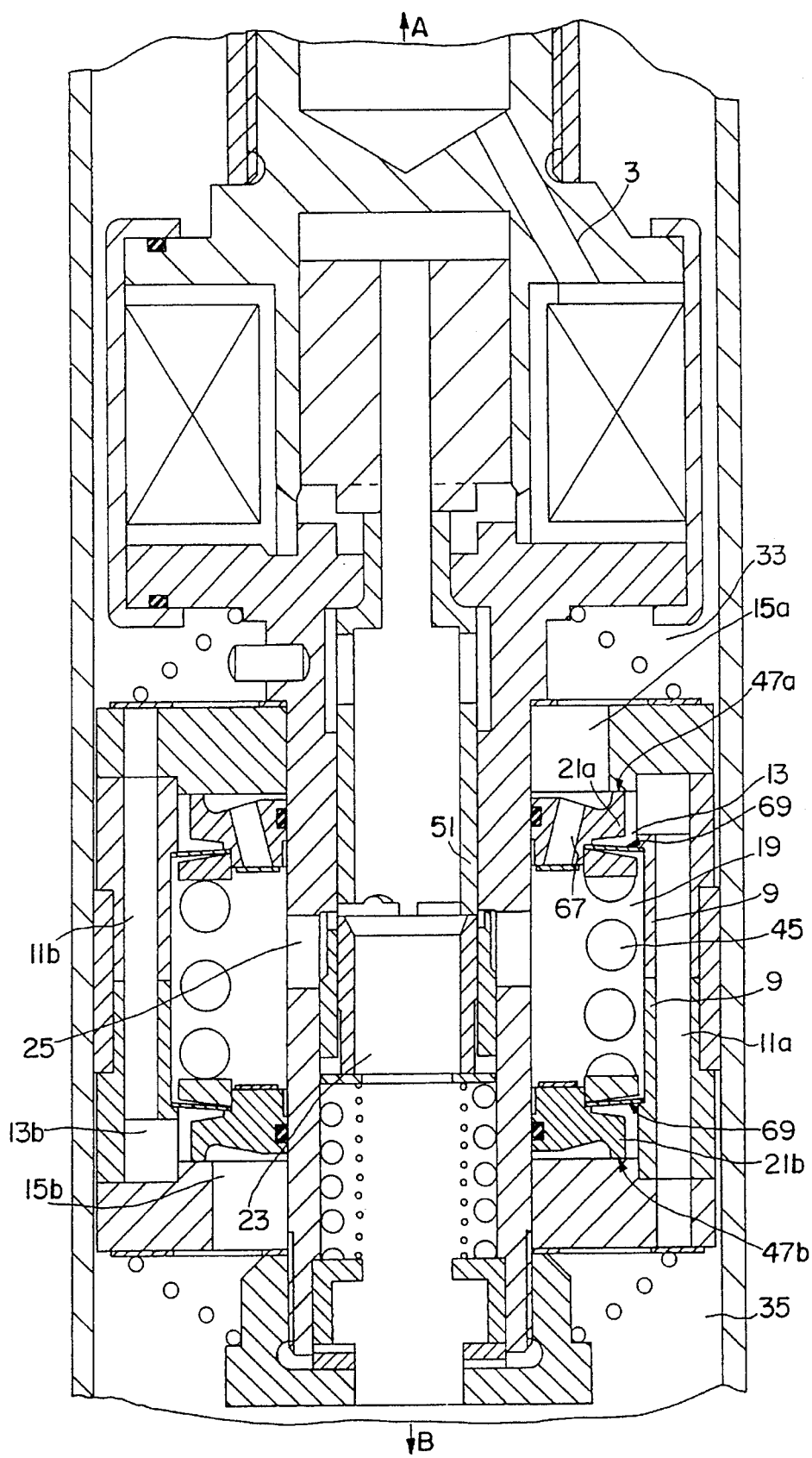
FIG. 3 shows a damping valve device with damping force adjustments in opposite directions.

FIG. 3 illustrates essentially the same structure as FIG. 2, but there are functional differences which are described below.

One of several differences between the structure illustrated in FIG. 3 and the structure illustrated in FIG. 2 is that the control chamber 19 in FIG. 3 essentially has no non-return valves (as indicated at 37a and 37b in FIG. 1a–1). Preferably, in accordance with the embodiment illustrated in FIG. 3, only the main stage valve body 21a has holes 67 for the bypass flow and the main stage valve body 21b is preferably designed as a solid body. The antechamber 23 also preferably has no non-return valves (as indicated at 31a and 31b in FIG. 1a–1), whereby there is preferably no connection between the antechamber 23 and the work chamber 33, and the connection from the antechamber 23 to the work chamber 35 preferably remains straight.

When the piston rod 3 executes a stroke in direction A, the medium preferably flows into the inflow opening 15a, whereby the bypass flow preferably continues through the holes 67 into the control chamber 19. As a function of the discharge via the flow cross section, that is, the advanced opening cross section between the armature 51 and the sleeve 53, a closing force is preferably exerted on the main stage valve body 21a, on which is superimposed the force of the closing spring 45, since the control-chamber-side surfaces of the main stage valve body 21a are essentially smaller than the valve-opening surfaces. If the pressure in the work chamber 33 increases further, the main stage valve body 21a preferably lifts up from its valve seat 47a. The radial inflow 13 to the connecting passages 11a is preferably thence opened. In the decompression direction, there is thus a damping force control by means of the damping medium discharge from the control chamber 19. When the damping valve 1 receives an inflow from direction A, the damping medium preferably presses the main stage valve body 21b against its valve seat. The main stage valve bodies 21a/b essentially cannot be overflowed, since spring plates 69 close the gap between the inside diameter of the damping valve intermediate body 9 and the main stage valve bodies 21a/b.

When the inflow is in the reverse direction, i.e. from direction B, the damping medium preferably simultaneously flows into the inflow opening 15b and into the antechamber 23. As a function of the advanced opening cross section, the damping medium can preferably flow via the radial flow connections 25 into the control chamber 19 with a more or less large pressure loss. When there is a small advanced opening cross section, there is preferably only a small pressure force of the damping medium in the control chamber, which opposes the system pressure applied in the inflow opening 15b.

Consequently, the main stage valve body 21b preferably lifts up from its valve seat 47b and releases the inflow 13b to the connecting passages 11b. The damping force characteristic is preferably set for the direction B from the inflow into the control chamber 19.

If we start with a stationary status of the armature 51, in which the advanced opening cross section is relatively large, then there is essentially a soft damping force characteristic in stroke direction A and a hard damping force characteristic in stroke direction B. When there is a small advanced opening cross section, the damping forces are essentially on an exactly opposite level for both of the flow directions. If, and to the extent that the damping force setting for the one stroke direction is adjusted to a more extreme position, the damping force setting for the other stroke direction is also essentially adjusted in the opposite direction. The damping valve device 1 in this embodiment is particularly attractive, if the intention is to achieve a levelling of the vehicle, or to realize a "skyhook" shock absorber, to reduce the switching rates of the damping valve device 1.

Figure 4:
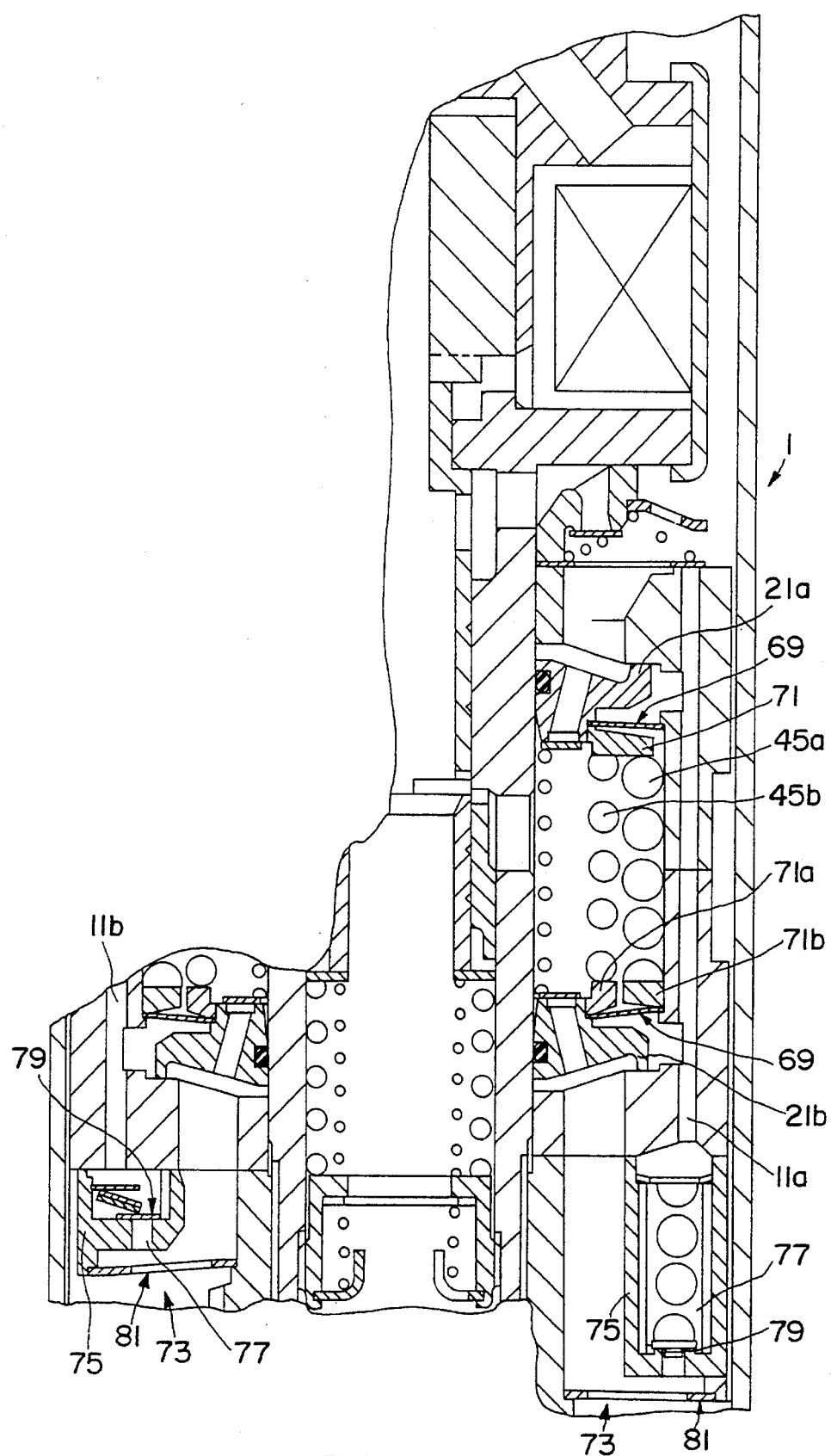
FIG. 4 shows a damping valve device with pressure control valves.

FIG. 4 illustrates essentially the same functional design as FIG. 2. One of several differences is that there are preferably two closing springs 45a/45b for the two main stage valve bodies 21a/21b. The main stage valve body 21a preferably has, for both springs, a common support body 71, which is preferably engaged with the inside diameter of the spring plate 69. The main stage valve body 21b also preferably has a spring plate 69, but two support bodies 71a/71b are preferably supported on it. For the main stage valve body 21a, that means that the sum of the spring forces of the closing springs 45a/45b is essentially effective, but for the main stage valve body 21b only the spring 45b is essentially effective, since the spring 45a is supported by the outside diameter area of the spring plate 9 (see FIG. 1a–1) on the damping valve housing. This measure essentially increases a basic, directionally-dependent damping force setting, without increasing the axial size of the control chamber 19.

The damping valve device 1 also preferably has a pressure control valve 73, which preferably consists of a non-return valve body 75 into which a connection cross section 77 has been worked, and which is preferably covered by a spring-loaded closing body 79. If the pressure on the closing body 79 exceeds a level which is greater than the spring load, the closing body 79 preferably lifts up and opens the path into the connecting passages 11a and 11b. In the opposite flow direction, the pressure control valve 73 preferably opens with practically no loss of pressure against the force of a guide spring 81.

Figure 5:
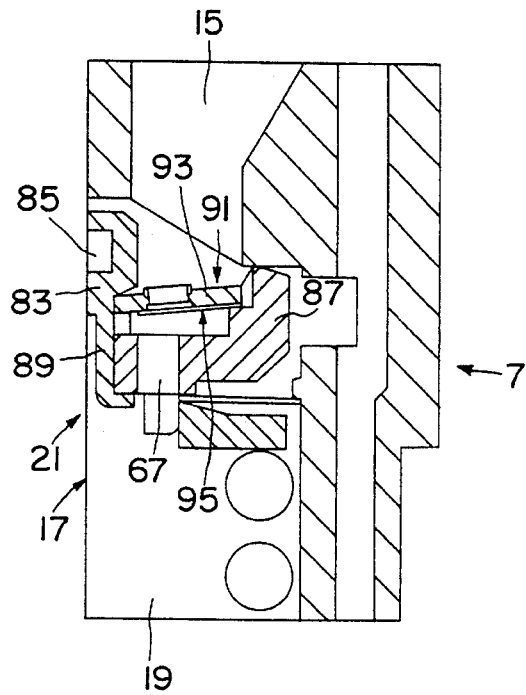
FIG. 5 shows a damping valve device with pressure control valve in the main stage valve body.

FIG. 5 is restricted to an illustration of a detail of the damping valve device 1 in the vicinity of the damping valve body 7, in particular on a main stage valve body 21. The main stage valve body 21 can preferably be designed in two parts. It comprises, among other things, a main stage valve body guide 83 with a seal 85, which preferably acts against the pivot segment 17. The second part represents the valve body 87 proper, which is preferably centered on a guide web 89. Holes 67 are preferably made in the valve body 87, and are preferably covered in the direction of the illflow opening 15 by a combined non-return and pressure control valve 91, consisting of two valve disc bodies braced against one another. The pressure control valve 91 is preferably formed by a plate spring 93 which is braced between the main stage valve body guide 83 and the valve body 87. The spring plate 93 preferably has holes which are covered by a highly-elastic disc 95, which preferably lifts up in the inflow direction of the control chamber 19 from the spring plate 93. When the pressure conditions are in the conventional range of operation of the shock absorber, the non-return valve 91 preferably works as described above with reference to FIGS. 1 and 2. The medium preferably flows into the inflow opening 15, whereby the bypass flow preferably continues through the holes in the spring plate 93 and the elastic disc 95 lifts up, so that the damping medium can flow into the control chamber 19. When the inflow is in the reverse direction and there is an overpressure in the control chamber 19, the outside diameter of the spring plate 93 preferably lifts up from the valve body 87, so that the pressure in the control chamber 19 can drop quickly. The advantage of a pressure control valve in the bypass flow is that only very small volume flows need to be used to achieve protection against overpressure.

Figure 5A:
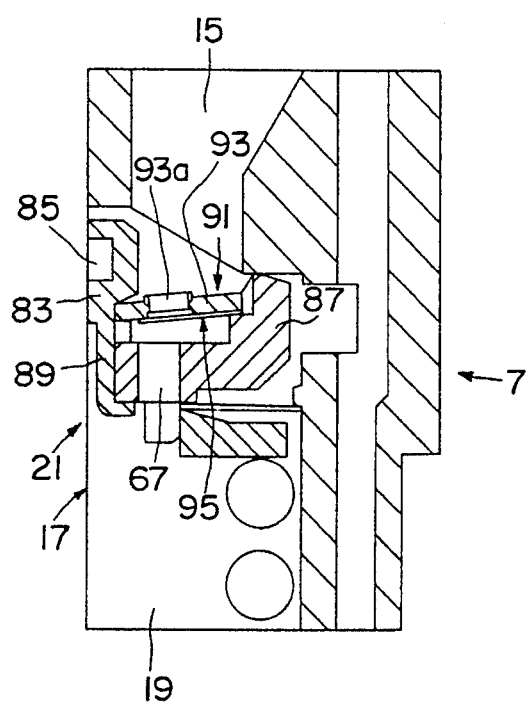
FIG. 5a is essentially the same view as FIG. 5, but more detailed.

FIG. 5a is substantially the same view as FIG. 5, but more detailed. As shown in FIG. 5a, according to a preferred embodiment of the present invention, disc 93 is preferably provided with a passage or hole 93a to permit flow therethrough.

Figure 6:
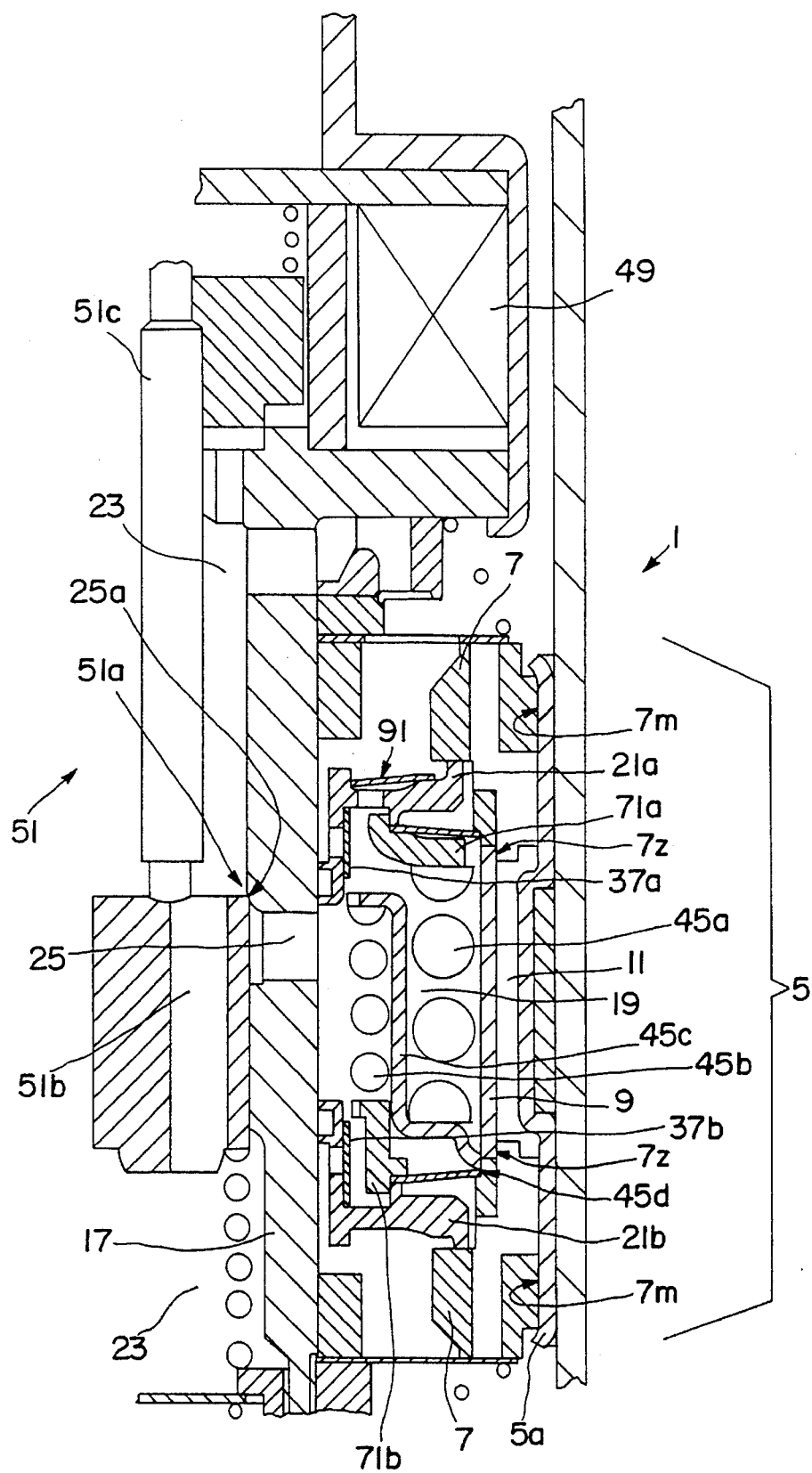
FIG. 6 shows a damping valve device with a seat valve.

FIG. 6 illustrates a damping valve device 1 which essentially comprises a combination of features found in the embodiments represented by FIGS. 2, 4 and 5, so that the following description relates essentially only to the differences in the designs. One general difference is that, according to the embodiment illustrated in FIG. 6, an armature 51 preferably forms a seat valve 51a together with the pivot segment 17. The pivot segment 17, in the vicinity of the radial flow connection 25, preferably has a slanted surface 25a, so that a continuous opening action of the seat valve 51a is guaranteed. The armature 51 preferably has a connection hole 51b, so that the two parts of the antechamber 23 are preferably connected and the armature 51 is pressure-equalized. Inside the armature 51, there is also preferably a connecting rod 51c, which, as shown, preferably has a crown on at least one end, so that an angle offset equalization becomes possible inside the damping valve device.

The non-return valves 37a/b also preferably differ from the valves described further above. For example, the bypass flow preferably flows radially into the control chamber 19, so that the non-return valves 37a/b must essentially execute a radial motion. Therefore, for realization of non-return valves 37a/b, ring-shaped elastic closing bodies are preferably inserted into the valve 1, which ring bodies, as a function of the expected pressure level, are preferably made of plastic, rubber or, for particularly high pressures, of a slotted metal ring. These embodiments of the check valves essentially make possible a non-linear opening action in the inflow direction, which can be very advantageous for the tuning of the shock absorber. The number of parts, in particular the number of moving parts, is also essentially reduced. Utilizing the advantages described above in relation to FIG. 5 regarding the use of a pressure control valve, the pressure control valve 91 is preferably separated from the non-return valve 37a. The expense of the pressure control valve is thereby essentially reduced to one or more spring plates, which are braced on the main stage valve body.

An additional significant difference from the variants described above, in particular with reference to FIG. 4, is that the two closing springs 45a, 45b, on account of their particular orientation, essentially do not involve any dependencies on the spring forces for the main stage valve bodies 21a, 21b. A spring guide sleeve 45c, which is preferably stationary in relation to the damping valve intermediate body 9, is the support mechanism for the two springs, so that the two spring forces do not affect one another. In this presentation, the prestress force of the closing spring 45a is preferably several times greater than that of the closing spring 45b, by a factor of approximately 4, on the basis of experience, so that the closing spring 45a preferably defines the position of the spring guide sleeve 45c on a shoulder 45d of the damping valve housing 5. Alternatively, the spring guide sleeve 45c can also preferably be braced between a damping valve head body 7 and the damping valve intermediate body 9. The closing springs 45a/b, by means of support bodies 71a/b, are preferably engaged with the main stage valve bodies 21a/b, whereby in particular the support body 71b preferably performs a guide function for the non-return valve 37b by means of its ring contour.

In the damping valve device 1, between the facing sides of the damping valve head bodies 7 there is preferably a rather large number of parts arranged in a row which, on account of the differences in their tolerances, have a predominant effect on the prestress lengths of the closing springs 45a/b. That can result in significant damping force fluctuations, but they can be reduced by checking the function of the damping device 1 during assembly, and reducing the distance between the two damping valve head bodies 7 until the prestress length of the springs 45a/b is set. For this purpose, at least one of the damping valve end bodies 7 is displaced axially relative to a jacket tube 5a toward the damping valve intermediate body 9, so that the latter experiences a reduction of its axial length. For that purpose, the damping valve intermediate body 9 is preferably made of a plastically deformable material, e.g. aluminum. Once the correct adjustment has been made, the jacket tube 5a is preferably connected to the damping valve head body 7, e.g. by means of hammering the edge.

The damping valve intermediate body 9 is preferably guided by centerings 7z of the damping valve head body 7. The jacket tube 5a is also radially supported on the circumferential surfaces 7m, so that the toroidal space 11 between the jacket tube 5 and the damping valve intermediate body 9 is available as a connection passage 11 for the main flow.

FIGS. 7a to 7d show a damping valve device 1 which has two control chambers 19a/19b, which are controlled by a common armature 51. The control chambers 19a/19b inside the damping valve housing 5 are separated by a hydraulically tight partitions 97. Inside the armature, there are recesses 59a/b, which in turn are axially enlarged by moldings 61a/b. The rest of the design is essentially the same as in FIG. 2. The armature 51, together with the sleeve 53, forms advanced opening cross sections, which are effective between the antechamber 23 and the radial flow cross sections 25. The sleeve 53 has control apertures 99a/b and notches 57 at some axial distance from one another, which correspond to the control chambers 19a and 19b respectively.

Figure 7A:
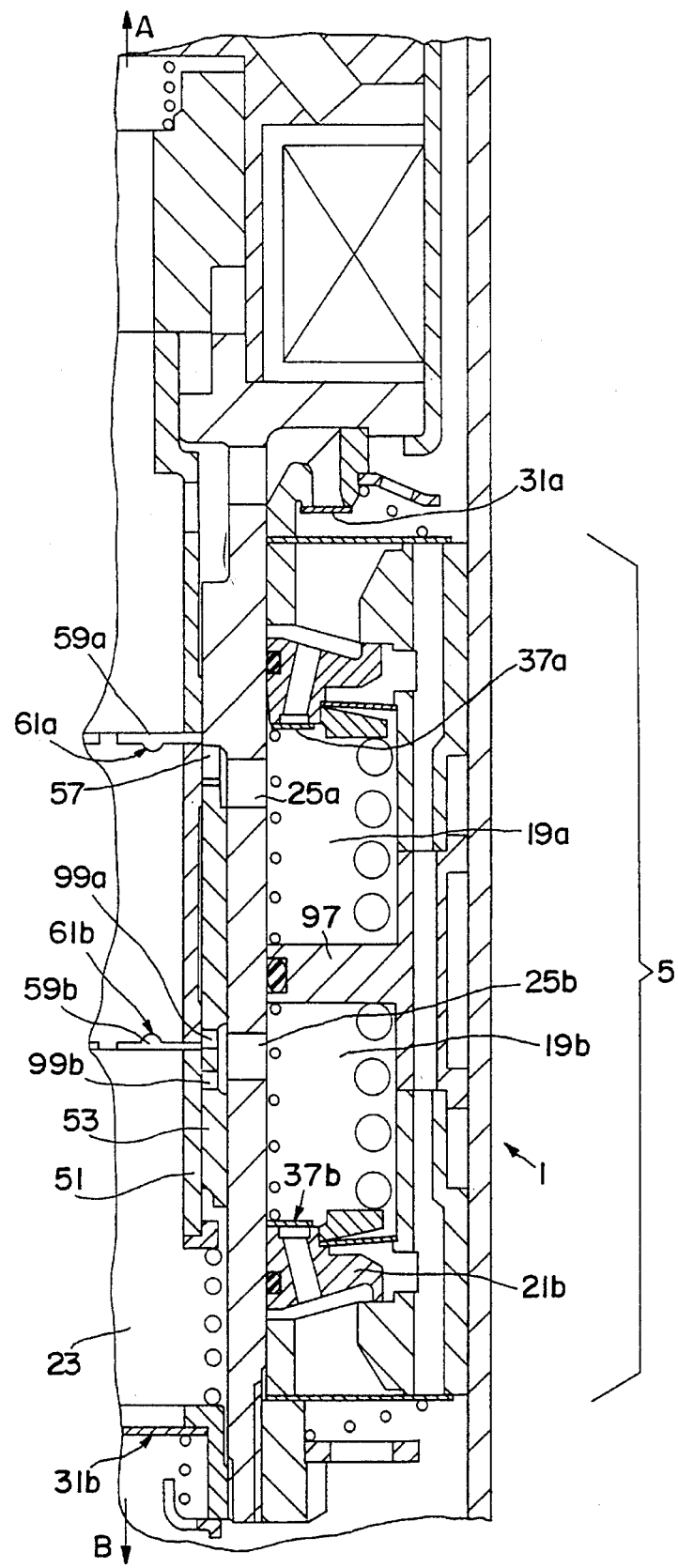
FIGS. 7a–d show a continuously adjustable damping valve device with two control chambers.

In FIG. 7a, the armature 51 assumes a position in relation to the sleeve 53 in which the notch 57 overlaps only with the molding 61a, so that there is a small advanced opening cross section. The molding 61b with the recess 59b in its entire cross section is located inside the holes 99a. This position, for a stroke movement of the damping valve device 1 in direction A, means that the damping medium flows in a controlled manner out of the control chamber 19a and the tendency is toward a hard damping force characteristic. The damping medium can of course flow in through the recesses 59b and moldings 61b via the control apertures 99a into the control chamber 19a, but a non-return valve 37b blocks the outflow, so that the main stage valve body 21b closes the control chamber 19b. The bypass flow from the control chamber 19a can be made to flow out by means of the non-return valve 31b, via the antechamber 23.

In the stroke direction B of the damping valve device 1, the bypass flow flows through the control chamber 19b and the control apertures 99a into the common cross section of the recesses 59b and moldings 61b into the antechamber 23. A short circuit via the control chamber 19a is prevented by the non-return valve 37a. The outflow from the antechamber 23 is controlled by the non-return valve 31a. This is a soft basic setting, but one which becomes progressively harder, the greater the overlap between the recess 59a and the notch 57.

Figure 7B:
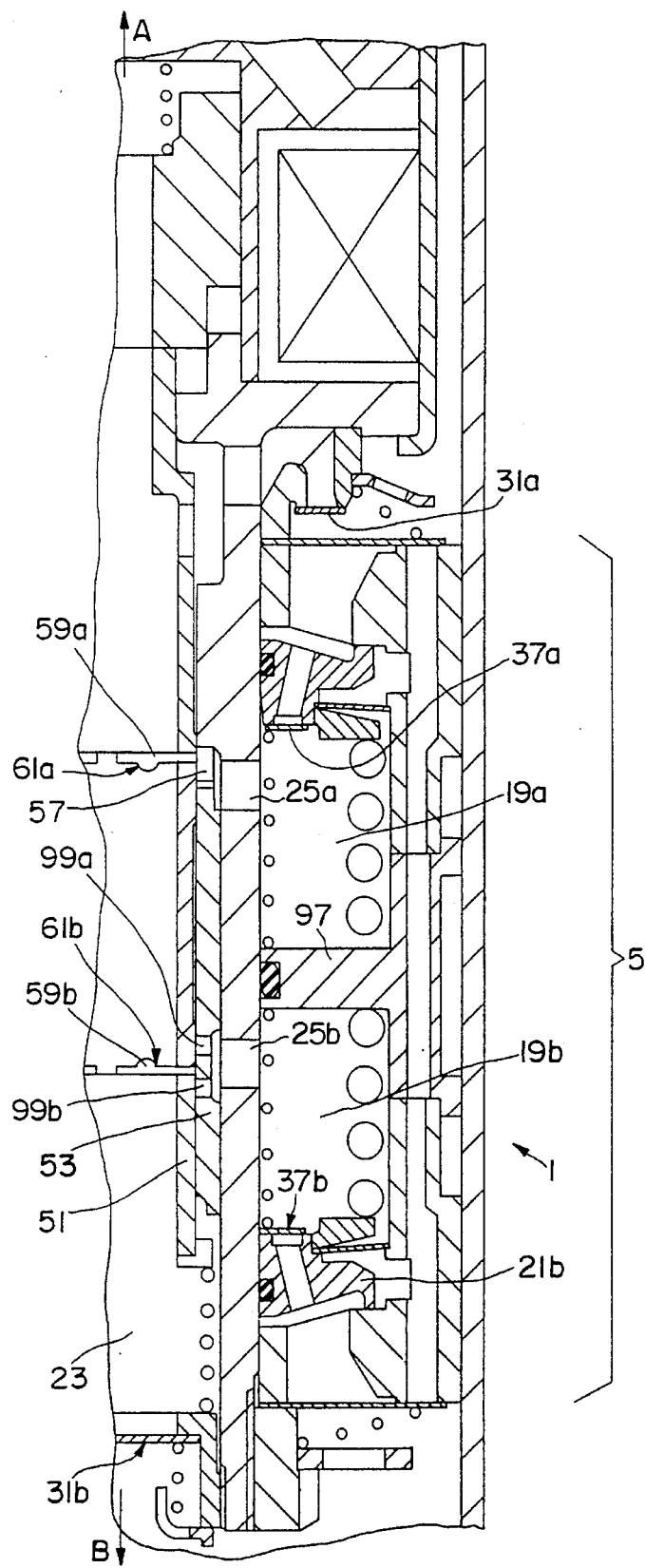

FIG. 7b shows the extreme setting/position between the recess 59a or molding 61a and the notch 57, as well as the recess 59b and molding 61b, with the control apertures 99a. In this armature position, the softest characteristic is in stroke direction A, and the hardest characteristic in decompression direction B.

Figure 7C:
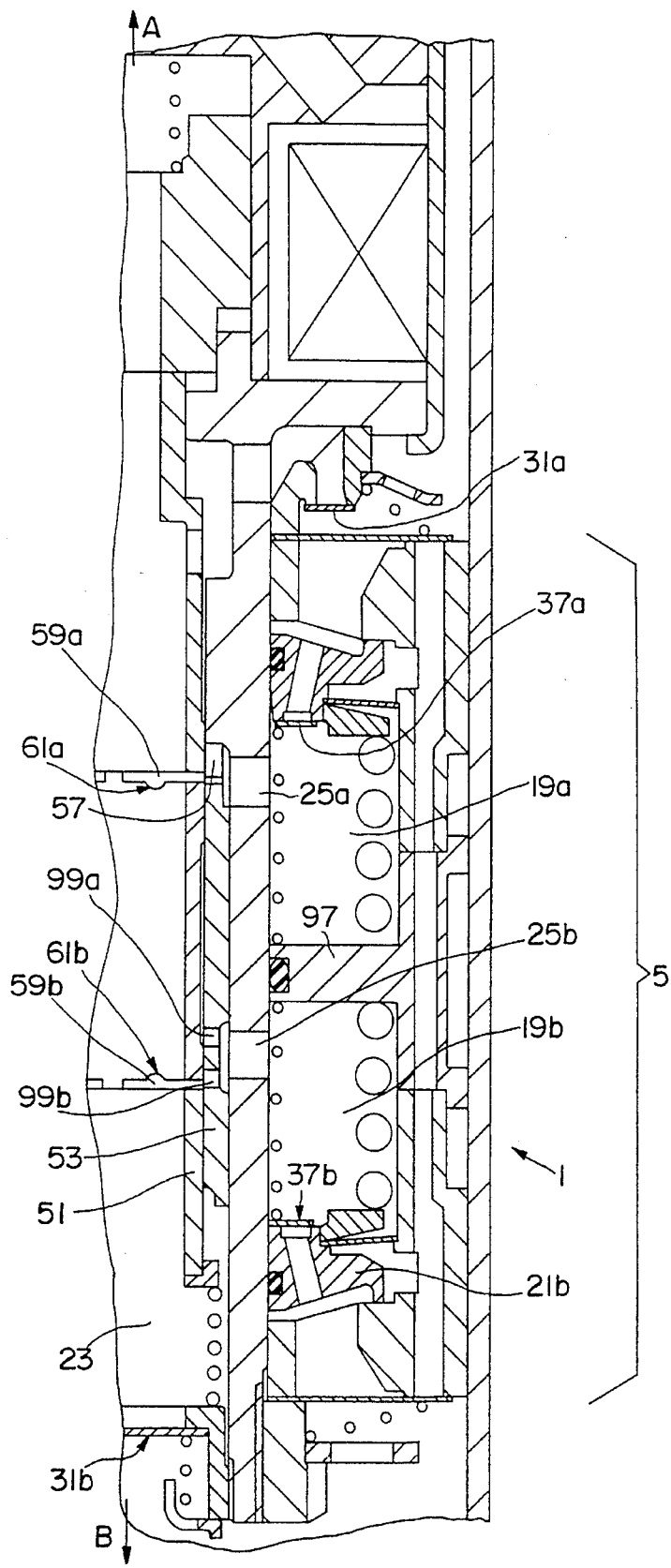

In FIG. 7c, the outflow from the control chamber 19b always occurs via the control apertures 99b. The size of the overlap between the notches 57 and the recesses 51a and 51b determines the damping force. Likewise, the damping force is set by means of the control apertures 99b with the recesses 59b and the moldings 61b. The overlaps or advanced opening cross sections are changed in the same direction when the armature moves. For the damping force setting, that means that when there is an enlargement of the advanced openings, the damping force setting in the decompression and in the compression direction is set uniformly toward a softer damping force. For an adjustment tending toward a harder damping force characteristic, both advanced openings are reduced in size.

Two basic settings of the damping valve device 1 are realized by means of the two control apertures 99a/b or groups of apertures, if there are a number of apertures, which means that a continuous adjustment of the damping force between two extreme settings, "hard" and "soft", is possible for each stroke direction.

Figure 7D:
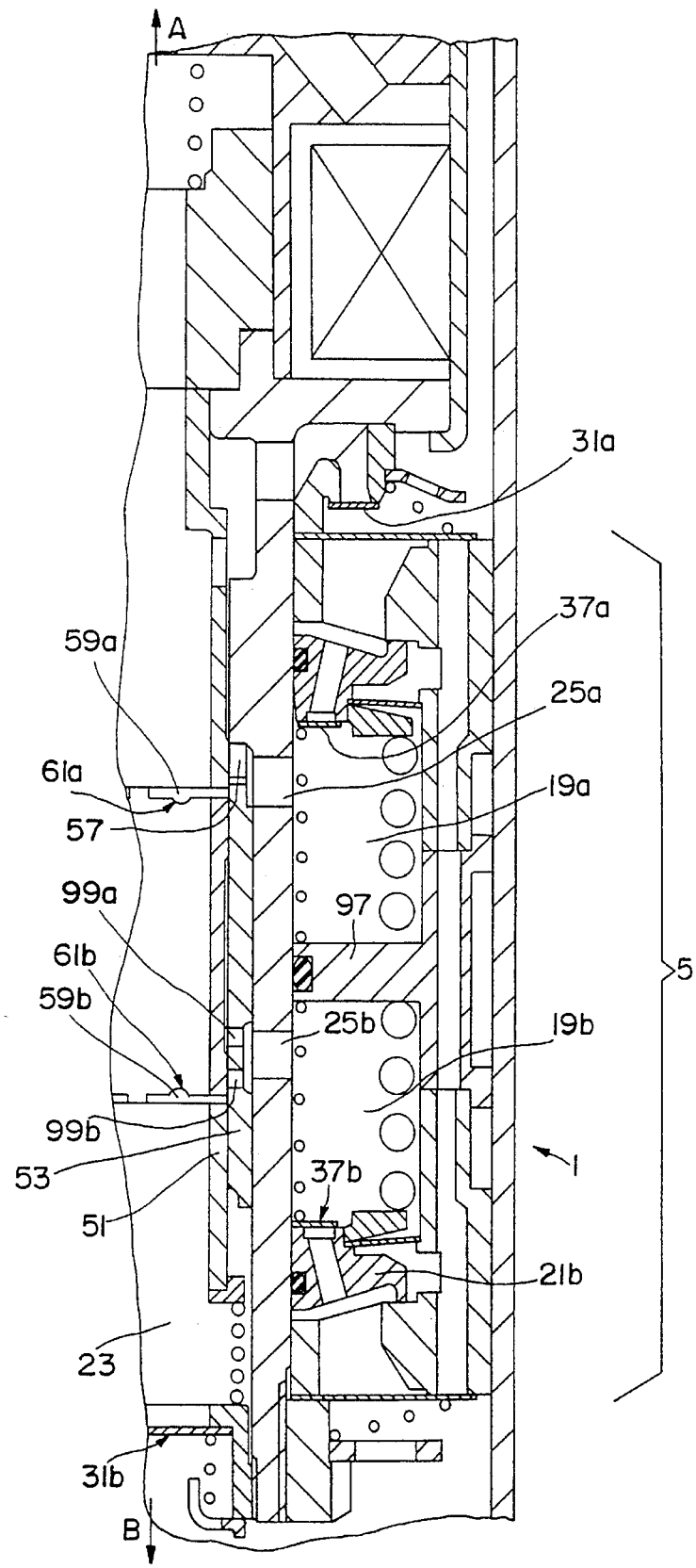

FIG. 7d shows the armature in the setting which achieves the hardest setting for both stroke directions.

FIGS. 8a to 8d show an armature 51 which can be switched by discrete intervals, and which, in this configuration, makes possible two basic settings in connection with two damping force characteristics each. The damping force is set, essentially as in the preceding figures, by the overlap between the armature 51 and the sleeve 53. The difference with respect to FIGS. 7a to 7d is that the armature 51, the recesses 59a and 59b, and the moldings 61a/b all have one or more constant throttles 101a/b. In the sleeve 53, there is an extension of the radial flow connections 25a/b for each control chamber 19a/b.

Figure 8A:
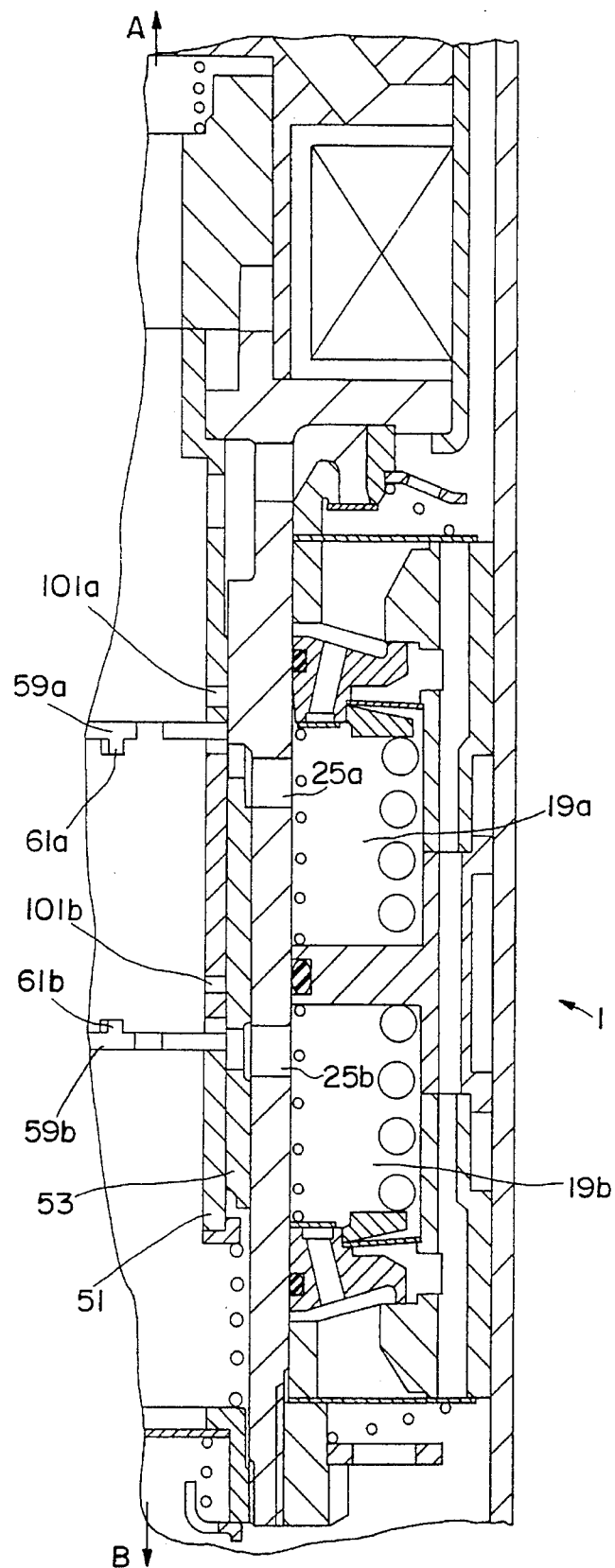
FIGS. 8a–d show a stepped damping valve device with two control chambers.

The general operation of the damping valve apparatus shown in FIGS. 8a to 8d is the same as in FIGS. 7a to 7d. The most important difference is the possibility of discrete settings for the adjustment of the damping valve device 1. In FIG. 8a, the hardest damping force setting is for the stroke movement in direction A, since the advanced opening cross section for the control chamber 19a is determined solely by the moldings 61a. For the stroke movement in the opposite direction, the maximum advanced opening, formed by the recess 59, essentially recess 59b, is available for the control chamber 19b, which thereby produces the soft damping force setting.

Figure 8B:
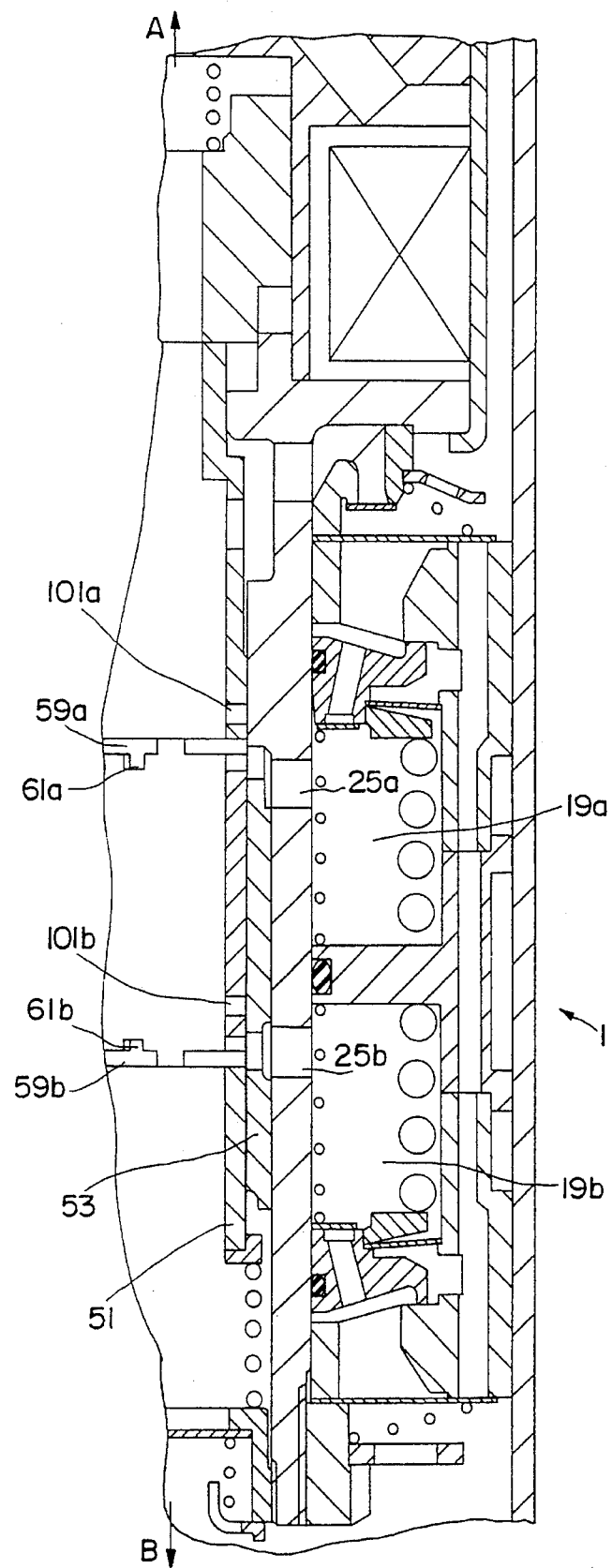

FIG. 8b shows an armature position which provides the maximum advanced opening for both stroke directions, so that the softest damping force is also set for both stroke directions.

Figure 8C:
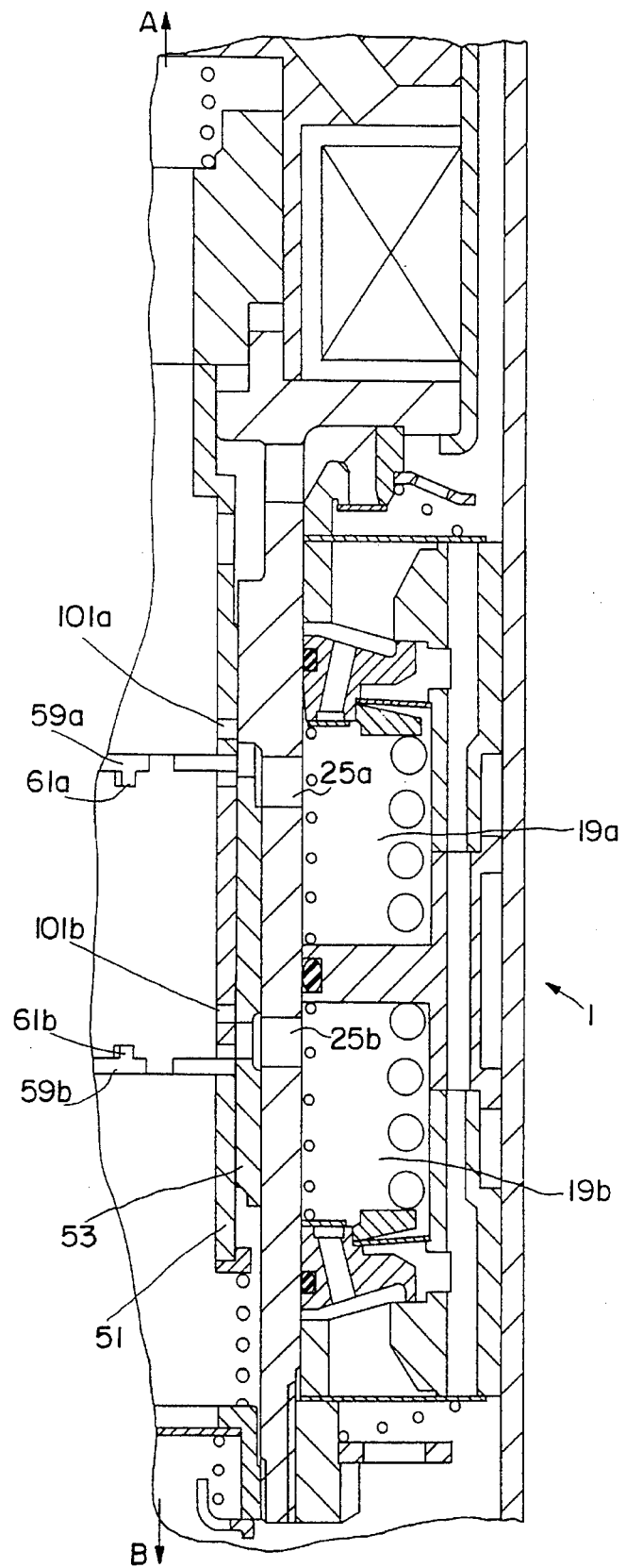
Figure 8D:
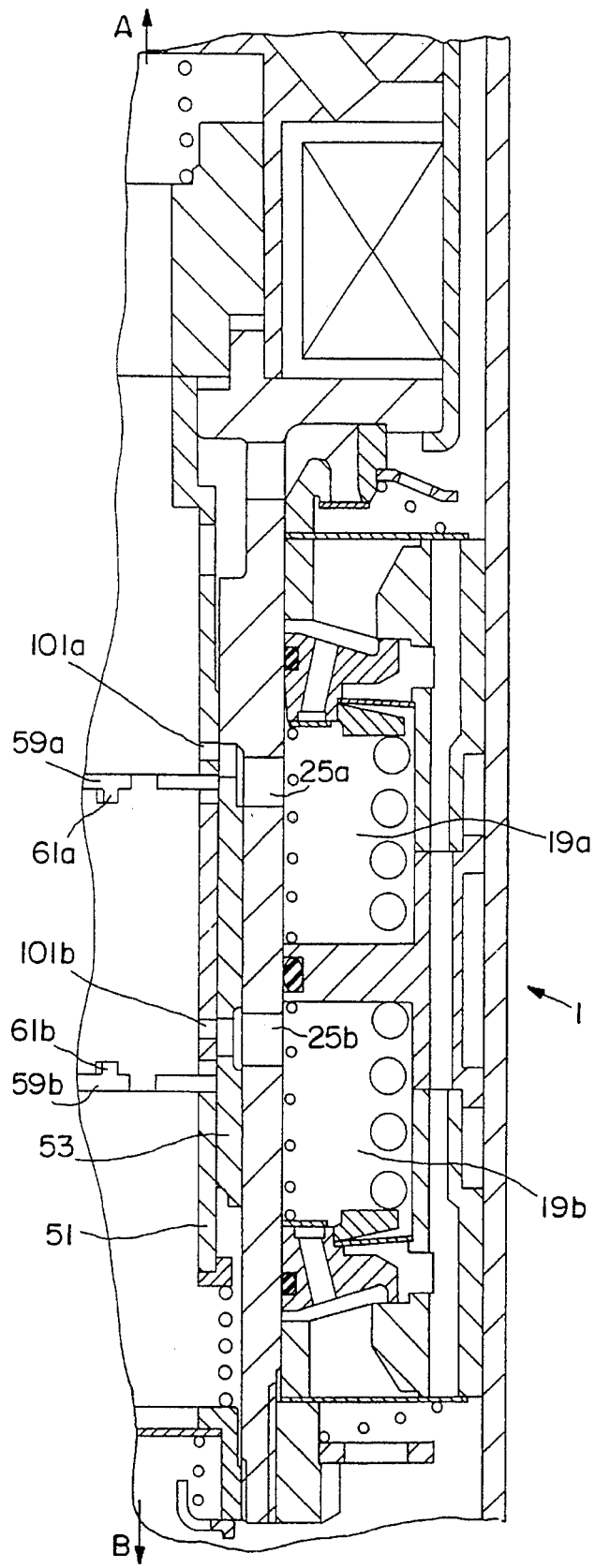

In FIG. 8c, the recess 59a overlaps the extension of the radial flow connection 25a, while for the radial flow connection 25b, only the moldings 61 can be used as the closure or advanced opening. Consequently, the damping valve device produces the softest damping force setting in stroke direction A and the hardest damping force setting in stroke direction B. Likewise, in FIG. 8d, the hardest damping force setting results for both flow directions, since only the constant throttles 101a and 101b determine the advanced opening cross section.

The position of the armature 51 for the damping valve setting of both stroke directions to "hard" is preferably placed so that the armature 51 travels the greatest distance and thus produces the greatest current for the ring magnet. This armature position is required only very infrequently in the day-to-day operation of a vehicle. As a result of this efficient arrangement of the control positions, it is possible to exert an indirectly positive effect on the power supply of the ring magnet.

The advantage of the stepped damping valve design compared to the continuously adjustable design is that the constant throttles 101a and 101b increase the allowable tolerances inside the damping valve device. It is generally not relevant whether the constant throttles assume their control points within a range of several tenths of a millimeter inside the continuation of the radial flow paths 25. The advanced opening is formed only by the cross section of the constant throttles.

The illustrations in FIGS. 7 and 8 can naturally be expanded to include the pressure control valves illustrated in FIGS. 4 and 5. Likewise, the use of the damping valve device 1 is not restricted only to a piston valve, but it can also be used in a bypass on a shock absorber.

Figure 9:
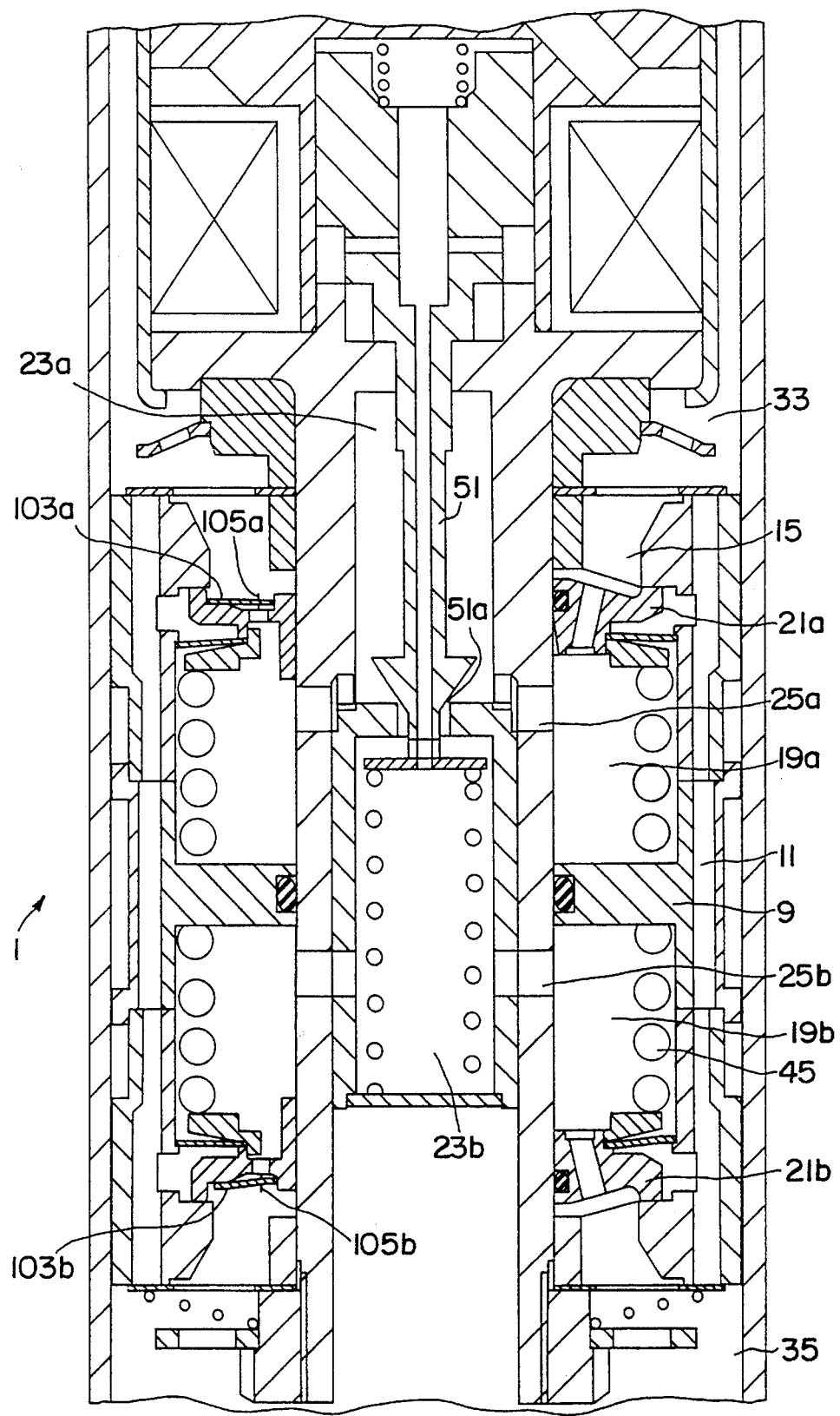
FIGS. 9 and 10 show a damping valve device with bi-directional flow.

FIG. 9 shows a damping valve device 1 which, like FIGS. 7 and 8, also has a control chamber which is divided into two control chambers 19a/19b. The two control chambers 19a/19b are connected to one another by means of the antechambers 23a/23b and the pilot stage valve, which is formed by the armature 51.

In FIG. 9, the function proceeds in the decompression direction, so that the volume flow from the work chamber 33 is divided into the bypass flow and the main flow, whereby the bypass flow flows through the main stage valve body 21a into the control chamber 19a, and a pressure builds up there which is exerted on the main stage valve body 21a. The bypass flow continues through the radial flow connection 25a to the pilot stage valve, which is designed as a seat valve 51a. Naturally, a rotary disk valve as illustrated in FIG. 1 can also be used. As a function of the opening position of the seat valve 51a, the pressure which builds up exerts a closing force on the main stage valve body 21a. As a result of the configuration of the valve-opening and valve-closing surfaces on the main stage valve body, corresponding to the description which refers to FIG. 1b, a throttle cross-section is formed in the connecting passages and also in the work chamber 35 which exerts a damping force on the main valve.

The bypass flow flows via the antechamber 23b and the radial flow connection 25b into the control chamber 19b, and empties via the main stage valve body 21b in the work chamber 35. The flow during compression damping, when the damping medium flows through the damping valve device 1 from the work chamber 35 into the work chamber 33, takes place via these same chambers and this same connection in the opposite flow direction for the bypass flow and the main flow.

In the left half of the drawing, the main stage valve bodies have directionally-dependent transmission valves 103a, 103b, each of which has at least one throttle cross section 105a, 105b, which act in the inflow direction of the corresponding control chambers. In the outflow direction out of the control chambers, the transmission valves, which are formed by spring plates, lift up from their seat surfaces, and release a larger cross section through the main stage valve bodies 21a/21b. As a result, the throttle cross section in the inflow direction in one of the control chambers 19 is smaller than in the outflow direction, in relation to a through flow direction of the damping valve device.

The transmission valves 103a/b, as indicated in the description of the function relating to the right half of the drawing, are not necessary, but they are appropriate for applications in which it is particularly difficult to tune the damping force. The ratio of the throttle cross section, e.g. 105a, in the inflow direction into the control chamber 19a, to the outflow cross section out of the control chamber 19b, is a yardstick for the variability of the damping force by the pilot valve. This ratio is also effective in the reverse flow direction.

Figure 10:
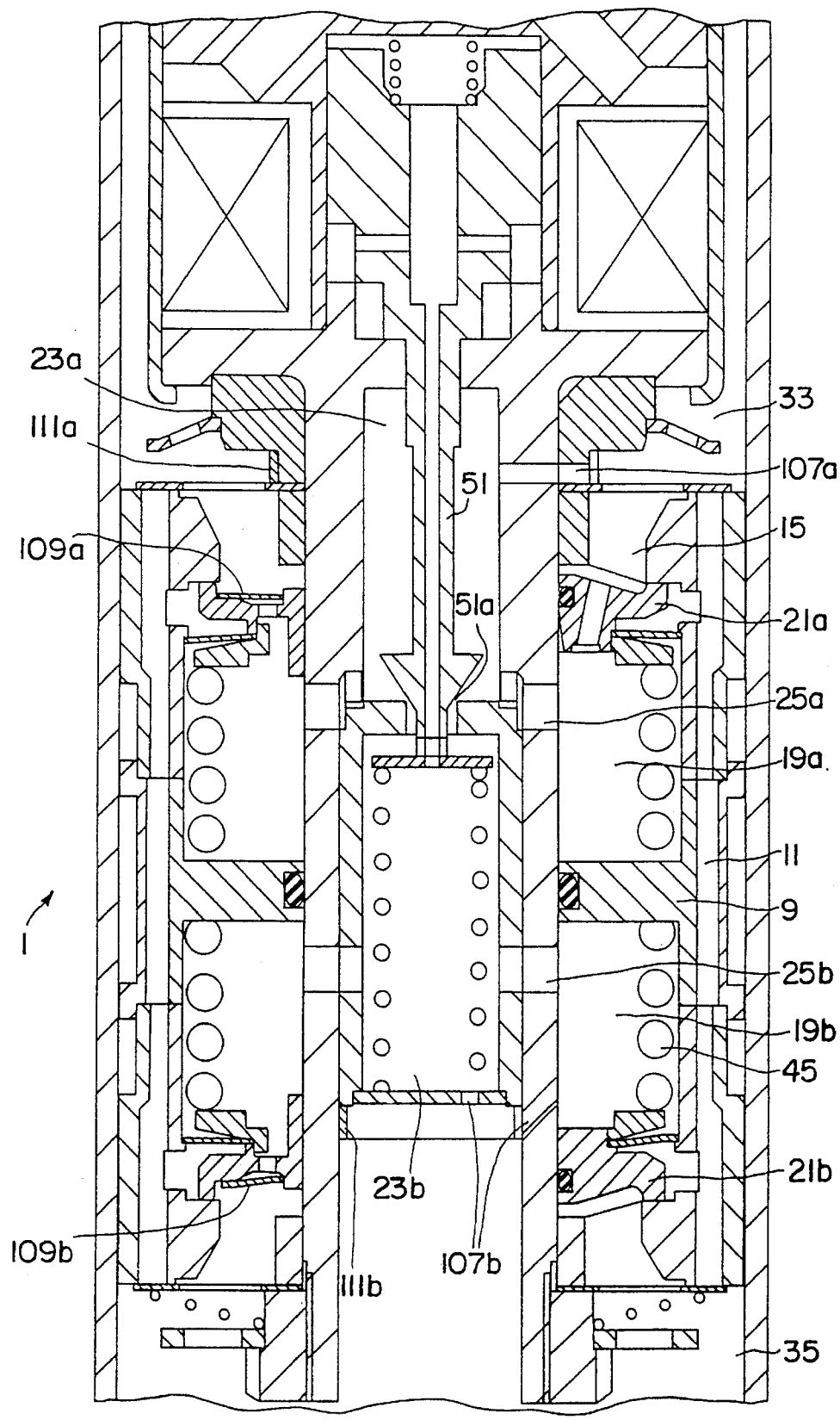

FIG. 10 is essentially exactly like the realization illustrated in FIG. 9, except for the configuration of the main stage valve bodies. There are different throttle cross sections 107a/107b, which transmit the bypass current to the pilot stage valve separately from the main stage valves 21a/21b. To adjust the ratio of the cross sections for the bypass current in the inflow and outflow direction of the control chambers 19a/19b, simple non-return valves 109a/109b are used. Alternatively, a retaining ring, similar to the retaining ring 37a illustrated in FIG. 6 can be used instead of the non-return valves 109a/109b. The retaining ring 111a/111b can thereby be realized so that it has a smaller transmission cross section in the inflow direction than in the output direction into the antechamber 23a or the control chamber 19b, with the advantage that the main stage valve bodies 21a/21b can be realized as solid bodies.

For both versions illustrated in FIGS. 9 and 10, the sleeve forming the antechamber 23a/23b is rigidly connected to neck of the piston rod. The antechambers 23a/23b, with the respective control chambers 19a/19b, form a common hydraulic action chamber, since the cross sections of the radial flow connections 25a/25b in relation to the other bypass current cross sections are realized so that essentially the same operating pressure is set in the antechambers/ control chambers which effectively correspond to one another.

Figure 11:
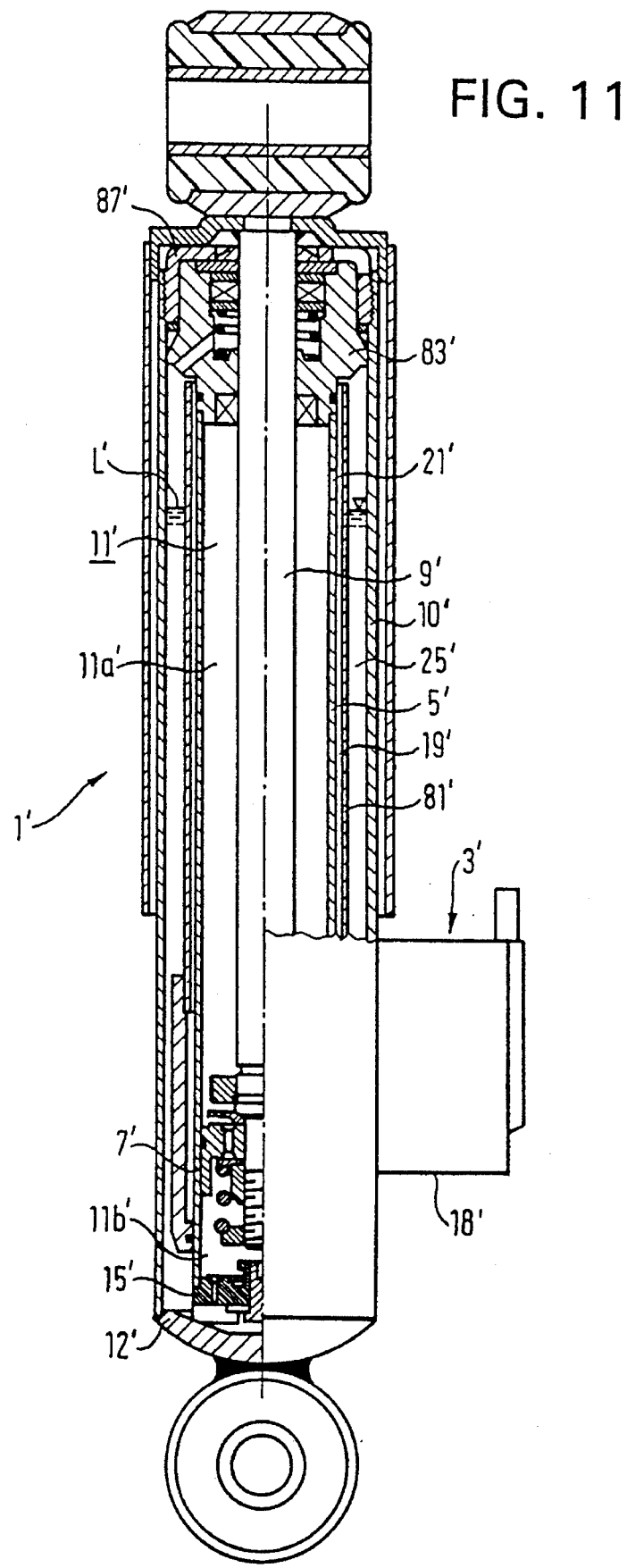
FIGS. 11 and 12 illustrate a shock absorber which may employ a damping valve device in accordance with the present invention.
Figure 12:
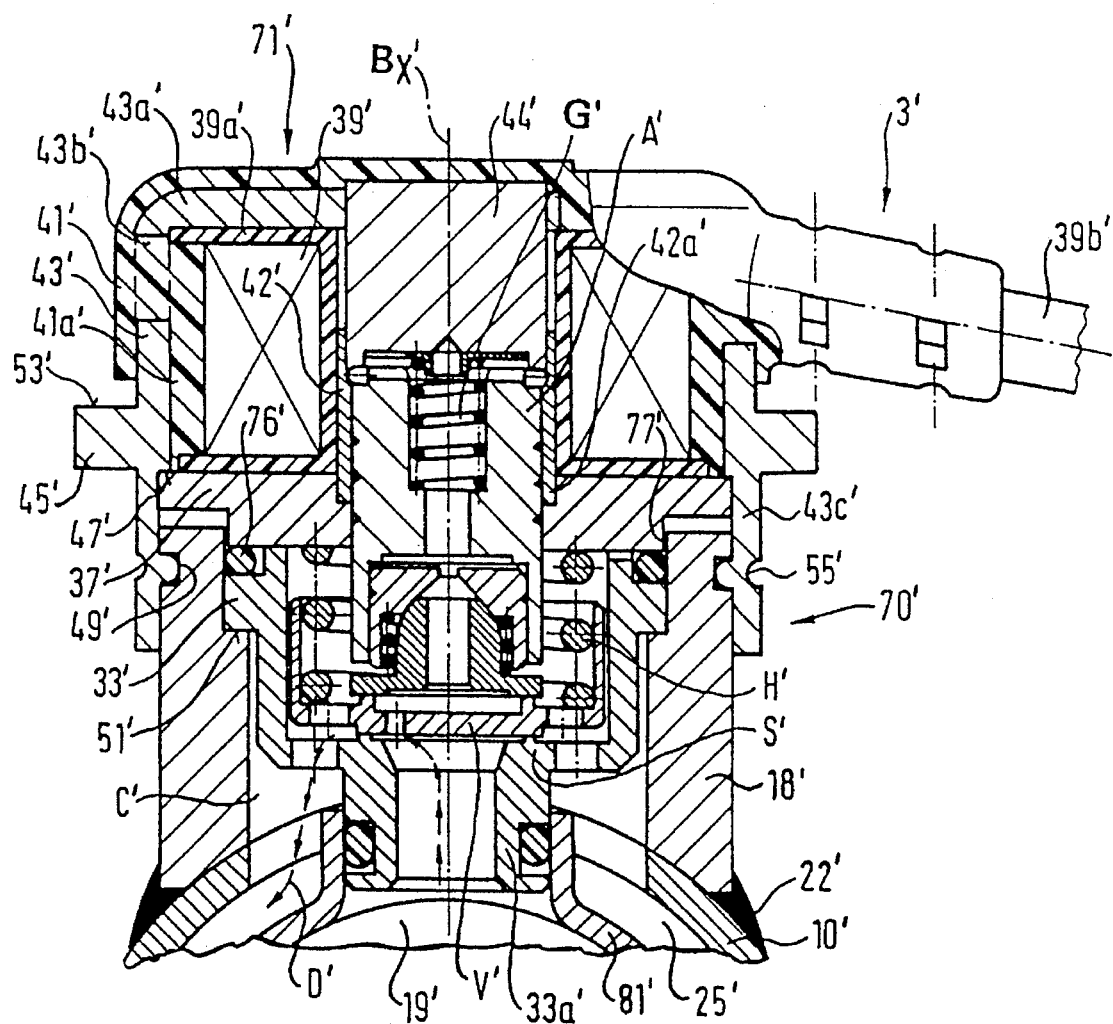

FIG. 11 shows a complete oscillation damper, shock absorber or vibration damper 1', which could incorporate the embodiments of present invention of FIGS. 1–10, a detailed illustration of the valve unit 3' being omitted for the sake of clarity. The embodiment shown in FIGS. 11 and 12 is present only as a non-restrictive example. It should also be understood that the piston 7' described hereinbelow may preferably, in accordance with at least one embodiment of the present invention, include a damping valve device 1 as described hereinabove.

The oscillation damper 1' consists essentially of a pressure pipe 5' in which a piston 7' on a piston rod 9' divides a working space 11' into an upper or piston-rod-side working chamber 11b'. A bottom valve unit 15' closes the pressure pipe 5' at the lower end thereof. A fluid path 19' is formed between the pressure pipe 5' and an intermediate pipe 81' said intermediate pipe 81' being arranged concentrically with respect to the pressure pipe 5'. A connecting orifice $2f$ in the pressure pipe 5' connects the upper working chamber 11a' with the fluid path 19'. A compensating chamber 25' is confined between the intermediate pipe 81' and a portion of the pressure pipe 5', on the one hand, and the container tube 10' on the other hand. This compensating chamber 25' is axially limited by a base member 12' and a piston rod guiding and sealing unit 83'. The working space 11' is separated by the piston 7' into the upper working chamber 11a' and the lower working chamber 11b'. Both the upper and the lower working chamber are filled with a liquid. The compensating chamber 25' is also filled with damping liquid up to the level L' and contains a possibly pressurized gas above the level L'. The bottom valve unit 15' provides communication between the working chamber 11b' and the compensating chamber 25'. The piston 7' provides communication between the lower working chamber 11b' and the upper working chamber 11a'. According to an illustrative example the oscillation damper works as follows: When the piston rod 9' moves upwards, a high flow resistance occurs across the piston 7' and a high pressure is generated in the upper working chamber 11a'. Liquid from the upper working chamber 11a' flows through said high flow resistance into the lower working chamber 11b'. As the piston rod 9' moves outward of the working space 11', the available volume within the working space 11' is increased. Therefore, liquid can flow from the compensating chamber 25' through the bottom valve unit 15' into the lower working chamber 11b'. The flow resistance through the bottom valve unit 15' is small in this phase of operation. The movement of the piston rod 9' with respect to the pressure pipe 5' is damped.

On inward movement of the piston rod 9' fluid flows from the lower working chamber 11b' through the piston 7' into the upper working chamber 11a'. The flow resistance across the piston 7' is relatively small and the flow resistance across the bottom valve unit 15' is relatively large. Therefore, a considerable pressure exists even within the upper working chamber 11a'. The volume within the working space 11' is reduced by the piston rod 9' entering into the working space 11'. Thus, damping liquid must flow from the lower working chamber 11b' through the bottom valve unit 15' into the compensating chamber 25'. In this phase of operation the flow resistance through the bottom valve unit 15' is high such that a high pressure occurs within the lower working chamber 11b' and also within the upper working chamber 11a'.

By the connecting orifice 21' and the fluid path 19' the upper working chamber 11a' is connected with the compensating chamber 25' via the valve unit 3'. As long as the valve unit 3' is closed, the bypass established by the connecting orifice 21', the fluid path 19' and the valve unit 3' is also closed. This is the hardest mode of operation of the oscillation damper. When, however, the valve unit 3' is more or less opened, the bypass is also open. As a result thereof the following behavior exists: On upward movement of the piston rod 9' liquid can flow from the highly pressurized upper working chamber 11a' not only across the piston 7' providing a high flow resistance but also from the working chamber 11a' through the bypass 21', 19', 3' to the compensating chamber 25'. Such, the damping force is reduced.

When the piston rod 9' moves downwards, there exists again a high pressure within the upper working chamber 11a', as described above. Therefore, damping liquid can flow from the upper working chamber 11a' through the bypass 21', 19', 3' to the compensating chamber 25'. This means that the damping liquid which must be expelled from the working space 11' as a result of the reduced volume therein does not only escape through the bottom valve unit 15' to the compensating chamber 25' but can also partially escape through the bypass 21', 19', 3' to the compensating chamber 25'. Such, the damping force is again reduced by the open bypass 21', 19', 3'. It is to be noted that the direction of flow of the damping liquid through the bypass 21', 19', 3' is the same, both on upward movement and downward movement of the piston rod 9' with respect to the pressure pipe 5'. By increasing the flow resistance through the valve unit 3' the damping force can be increased both for upward and downward movement of the piston rod 9', and by increasingly opening the valve unit 3' the damping force can be reduced both for upward movement and downward movement of the piston rod 9'. It is possible to selectively open and close the valve unit or to continuously vary the flow resistance through the valve unit 3'.

In FIG. 12 one can again see the fluid path 19' and the compensating chamber 25', which are interconnectable through the valve unit 3'. The fluid path 19' is connected to the upper working chamber 11a'. The flow direction from the fluid path 19' to the compensating chamber 25' across the valve unit 3' is indicated by the dotted line D' provided with arrows indicating the flow direction both for inward movement and outward movement of the piston rod 9' with respect to the pressure pipe 5'. One can see in FIG. 12 a valve member v' which can be lifted with respect to a valve seat 5', such as to open the flow path D' from the fluid path 19' to the compensating chamber 25'. Generally, it is sufficient to say that the valve member V' is urged downward in the closing sense towards the valve seat S' by a helical compression spring H' and that the valve member V' can be lifted in response to upward movement of an electromagnetic armature member A'. This armature member A' is biased in downward direction by a helical compression spring G' and can be lifted by energization of a magnetic coil 39' which is energized through a current supple cable 39b'.

The valve unit 3' comprises a housing 70'. This housing 70' is composed by the side tube 18' and a cover unit 71'. The side tube 18' is welded at 22' to the container tube 10'. The cover unit 71' is fastened to the side tube 18'.

A pot-shaped valve components housing 33' is inserted into the side tube 18' and is axially located on a shoulder face 51' inside the side tube 18'. Various valve components are located inside the valve components housing 33'. The lower end of the valve components housing 33' is shaped as a tube section 33a', which provides the valve seat S' and is sealingly connected to the fluid path 19'.

The cover unit 71' comprises an iron jacket 43' integral with an iron end wall 43a'. The iron jacket 43' and the iron end wall 43a' are coated with a plastic layer 41'. An annular electromagnetic coil 39' is housed within the iron jacket 43'. This electromagnetic coil 39' is carried by a coil carrier 39a', which is annular about the axis $B_x'$ and is open in radial outward direction. The coil carrier 39a' is closed in radially outward direction by a plastics material 41a' integral with the plastic layer 41' through openings 43b' of the iron jacket 43'. The plastics layer 41' and the plastics material 41a' are integrally moulded by injection moulding with the iron jacket 43', the iron end wall 43a' integral therewith and the electromagnetic coil 39' carrier 39a' being inserted into the injection mould.

A ferromagnetic core 44' is inserted into a central opening of the iron end wall 43a' and covered by the plastics layer 41'. An iron flange portion 37' is provided at the lower side of the electromagnetic coil 38' and is engaged with a shoulder face 47' of the iron jacket 43'. A pole tube 42' is seated within an annular recess 42a' of the iron flange portion 37'. The pole tube 42' is sealingly connected to the iron flange portion 37' and to the ferromagnetic core 44'. The armature A' is guided within the pole tube 42'. The pole tube 42' is made of nonmagnetic material so that the magnetic field lines are deflected by the lower end of the pole tube 42'. The iron jacket 43', the iron end wall 43a', the ferromagnetic core 44' and the iron flange portion 37' form a ferromagnetic core arrangement which toroidally surrounds the electromagnetic coil 39'.

The cover unit 71' is fastened to the side tube 18' by a sleeve-shaped extension 43c' of the iron jacket 43'. This sleeve-shaped extension 43c' axially overlaps the side tube 18' by a circumferential bead 55' being embossed into a circumferential groove 49' on the radially outer face of the side tube 18'. The iron jacket 43' is provided with a pretensioning flange 45'. The pretensioning flange 45' offers a pretension face 53'. The cover unit 71' can be pretensioned in downward direction as shown in FIG. 12 toward the container tube 10' by a pretensioning tool engaging the container tube 10', on the one hand, and the pretensioning face 53', on the other hand. Such, the iron flange portion 37' is pressed against the upper end of the valve components housing 33', the valve components housing 33' is engaged with the shoulder face 51' of the side tube 18', and the iron flange portion 37' is engaged with the shoulder face 47' of the iron jacket 43'. The helical compression spring H' is compressed between the iron flange portion 37' and the valve member V', which is seated on the valve seat S'.

While maintaining this pretension of the cover unit 71' against the side tube 18', the bead 55' is rolled or caulked into the circumferential groove 49' of the side tube 18' so that after removing the pretensioning tool an internal pretension is maintained. A sealing ring 76' is, therefore, maintained in sealing engagement with the valve components housing 33', the iron flange portion 37' and the side tube 18'. Such, the compartment C' confined by the side tube 18' and the cover unit 71' is sealed against atmosphere. All components of the valve unit 3' are positioned with respect to each other, and the helical compression spring H' as well as the helical compression spring G' and further springs are biased to the desired degree.

It is to be noted that the upper end of the side tube 18' is radially engaged at 77' with the iron flange portion 37' such that when rolling or caulking the bead 55' into the groove 49', no deformation of the side tube 18' and of the iron jacket 43' can occur.

The electromagnetic coil 39' is completely separated from the liquid within the compartment C' by the iron flange portion 37'. The pretension during connecting the cover unit 71' and the side tube 18' is selected such that no play can occur.

One feature of the invention resides broadly in the shock absorber with adjustable damping force, comprising a pressure tube filled with damping medium, in which a piston on an axially movable piston rod divides a work chamber into a piston-side and a non piston-side chamber, whereby there is a damping medium flow between the two work chambers, which is divided into a main flow and a bypass flow, a damping valve device consisting of a damping valve body, with a main stage valve for each flow direction, each of which is formed by a main stage valve body, and a pilot stage valve which activates the main stage valve, an adjustable actuator, which controls a flow connection between the control chamber and a work chamber, characterized by the fact that the control chamber 19; 19a; 19b is limited axially by the first and second spring-loaded main stage valve bodies 21a; 21b, whereby the first main stage valve body, during the inflow from the closed valve position into an open position, is moved axially into the control chamber 19; 19a; 19b toward the second main stage valve body, which is held in the closed valve position by the damping medium, and when the inflow is in the reverse direction, the second main stage valve body is moved out of the closed valve position into an open position, axially toward the first main valve stage body which is in the closed valve position.

Another feature of the invention resides broadly in the shock absorber characterized by the fact that the main flow flows through the main stage valve in both flow directions and the bypass flow flows through the pilot stage valve 39, 51a in both flow directions.

Yet another feature of the invention resides broadly in the shock absorber characterized by the fact that inside the damping valve body 7, the bypass flow of damping medium runs through the control chamber 19; 19a; 19b and the main flow runs through connecting passages 11a; 11b radially outside the control chamber 19; 19a; 19b, and an antechamber 23 formed by the actuator is oriented concentrically to the control chamber 19; 19a; 19b, whereby between the antechamber 23 and a work chamber 33; 35 there is a connection in at least one flow direction, and thus there is a radial flow connection 25 which is controlled by the actuator between the control chamber 19; 19a; 19b and the antechamber 23.

Still another feature of the invention resides broadly in the shock absorber characterized by the fact that inside the damping valve body 5, at least for one flow direction, the main flow and the bypass flow have a common feed opening 15a; 15b.

A further feature of the invention resides broadly in the shock absorber according to claim 1, characterized by the fact that the damping valve device 1 is equipped with non-return valves 29a; 29b; 31a; 31b; 37a; 37b for the main flow and/or the bypass flow, so that for both flow directions of the control chamber 19; 19a; 19b, the damping force adjustment is made by controlling the discharge of the bypass flow between the control chamber 19; 19a; 19b and the antechamber 23.

Another feature of the invention resides broadly in the shock characterized by the fact that the damping valve device is equipped with non-return valves 19a; 29b; 31a; 31b; 37a; 37b for the main flow and/or the bypass flow, so that for one flow direction of the control chamber, the damping force is adjusted by controlling the inflow, and for the other flow direction the outflow of the bypass flow between the control chamber 19; 19a; 19b and the antechamber 23.

Yet another feature of the invention resides broadly in the shock absorber characterized by the fact that the main stage valve bodies 21a/21b have throttle holes, through which the bypass flow flows into the control chamber 19/19a/19b.

Still another feature of the invention resides broadly in the shock absorber characterized by the fact that the holes to the control chambers 19a/19b and/or to the antechamber 23/23a/23b have directionally-dependent transmission valves 103/105/111, which open up a larger throttle cross section in the outflow direction of the respective chambers than in the inflow direction.

A further feature of the invention resides broadly in the shock absorber characterized by the fact that the main stage valve bodies 21a; 21b are equipped with non-return valves 37a, 37b which open in the inflow direction of the bypass flow into the control chamber 19; 19a; 19b.

Another feature of the invention resides broadly in the shock absorber characterized by the fact that at least one of the non-return valves 37a; 37b is formed by an elastically deformable retaining ring.

Yet another feature of the invention resides broadly in the shock absorber characterized by the fact that the main stage valves have a directionally-dependent damping force characteristic, which are formed by several springs 45a; 45b, whereby all of the springs 45a/45b are supported on one main stage valve body 21a, and some of the springs 45a; 45b are engaged on the other main stage valve body, so that the spring forces for the main stage valve body 21a add up, and for the other main stage valve body 21b a portion of the spring forces are active.

Still another feature of the invention resides broadly in the shock absorber characterized by the fact that the main stage valves have directionally-dependent damping force characteristics, which are formed by several springs 45a; 45b, whereby the spring 45a is supported on one main stage valve body 21a and the spring 45b is supported on the main stage valve body 21b, whereby both springs 45a; 45b are engaged alternately on a spring guide sleeve 45c which is stationary relative to the damping valve intermediate housing 9.

A further feature of the invention resides broadly in the shock absorber characterized by the fact that the damping valve device 1 has at least one pressure relief valve.

Another feature of the invention resides broadly in the shock absorber characterized by the fact that the non-return valves for the main flows have pressure relief valves 73.

Yet another feature of the invention resides broadly in the shock absorber characterized by the fact that the non-return valve for the main flow consists of a non-return valve body 75 pressed by means of a spring 81 against the damping valve body 5, with a connection cross section 77 on both sides of the valve body, which in turn is covered by a spring-loaded closing body 79, so that in one flow direction of the main flow, the closing body 79 lifts up from the damping valve body, and in the other direction the non-return valve body 75 lifts up from the damping valve body.

Still another feature of the invention resides broadly in the shock absorber characterized by the fact that the pressure control valve releases the bypass flow by lifting a valve body, and bypasses the non-return valve for the control chamber 19.

A further feature of the invention resides broadly in the shock absorber characterized by the fact that the non-return valves 37a; 37b for the bypass flows are equipped with pressure relief valves 91.

Another feature of the invention resides broadly in the shock absorber characterized by the fact that the pressure control valve 91 for the bypass flow is located inside the control chamber 19; 19a; 19b, whereby the pressure control valve 91 and the non-return valve 37a, 37b are designed as a combination component, and are braced against one another as two valve disc bodies which alternately lift up from their valve seat surfaces.

Yet another feature of the invention resides broadly in the shock absorber characterized by the fact that the main valve body consists of two individual valves 83; 87, whereby the one body 83 represents the guide body and the other body represents the seat 87.

Still another feature of the invention resides broadly in the shock absorber characterized by the fact that the pilot stage valve is always partly open, so that the main stage valve 21a; 21b simultaneously represents a pressure relief valve.

A further feature of the invention resides broadly in the shock absorber characterized by the fact that the hydraulically active valve-opening surfaces of the main stage valve are larger than the valve-closing surfaces.

Another feature of the invention resides broadly in the shock absorber characterized by the fact that the actuator consists of a servomotor in connection with a rotary valve 39.

Yet another feature of the invention resides broadly in the shock absorber characterized by the fact that the actuator consists of a ring magnet 49 in connection with an axially-movable armature 51.

Still another feature of the invention resides broadly in the shock absorber characterized by the fact that the movable armature 51 represents a seat valve.

A further feature of the invention resides broadly in the shock absorber characterized by the fact that inside the armature 51 there is a connecting rod 51c, which has a crown on at least one end, and with a matching opposite surface forms an angle offset equalization.

Another feature of the invention resides broadly in the shock absorber characterized by the fact that the actuator is continuously adjustable.

Yet another feature of the invention resides broadly in the shock absorber characterized by the fact that the actuator can be adjusted in stages.

Still another feature of the invention resides broadly in the shock absorber characterized by the fact that the damping valve device 1 has two separate control chambers 19a; 19b, whereby the flow passes through a control chamber 19a; 19b for each flow direction, and the connections between the control chambers 19a; 19b and the antechamber 23) are controlled by a common actuator, so that overall there are two basic setting ranges of the damping valve device 1, whereby the one achieves a damping force adjustment in the same direction for both flow directions, and the other achieves a damping force adjustment in different directions.

A further feature of the invention resides broadly in the shock absorber characterized by the fact that the damping valve device 1 has two separate control chambers 19a; 19b, whereby the flow passes through a control chamber 19a; 19b for each flow direction, and the connections between the control chambers 19a; 19b and the antechamber 23 are controlled by a common actuator, so that for each flow direction of the damping valve device 1 there are at least two different damping force characteristics, which can be set as a function of the actuator position in the same direction or in different directions for the two flow directions.

Another feature of the invention resides broadly in the shock absorber characterized by the fact that the connection between the antechamber 23 and the control chamber 19; 19a; 19b represents the advanced opening cross section.

Yet another feature of the invention resides broadly in the shock absorber characterized by the fact that the damping valve housing 5 comprises a damping valve head body 7 and a damping valve intermediate body 9 on each end.

Still another feature of the invention resides broadly in the shock absorber characterized by the fact that the damping valve head bodies 7 are oriented symmetrically inside the damping valve housing 5.

A further feature of the invention resides broadly in the shock absorber characterized by the fact that a jacket tube 5a is located concentrically to the damping valve intermediate body 9, and at least one damping valve head body can be displaced relative to the jacket tube before it is fixed to the jacket tube, so that the axial length of the damping valve intermediate body 9 can be adjusted arbitrarily.

Another feature of the invention resides broadly in the shock absorber characterized by the fact that the fastening between the damping valve head body 7 and the jacket tube 5a is accomplished by means of a plastic deformation.

Yet another feature of the invention resides broadly in the shock absorber characterized by the fact that the damping valve body 7 and the damping valve intermediate body 9 are combined into a single component, so that the damping valve housing 5 consists of two identical but symmetrical individual parts.

Still another feature of the invention resides broadly in the shock absorber characterized by the fact that the main stage valves 21a; 21b are centered on a pivot segment 17 corresponding to the piston rod 3.

A further feature of the invention resides broadly in the shock absorber characterized by the fact that the damping valve device 1 has an emergency operating position which consists of at least one spring system 63, which pushes the armature 51 of the actuator against a contact surface 65, which results in a medium damping force setting.

Another feature of the invention resides broadly in the shock absorber characterized by the fact that the damping valve device 1 has an actuator which has a pressure-equalized actuating element 39; 51.

Yet another feature of the invention resides broadly in the shock absorber characterized by the fact that the damping valve device 1 has a two-part control chamber 19, whereby the two parts 19a/19b of the control chamber are connected by means of the pilot stage valve 39/51a.

Still another feature of the invention resides broadly in the shock absorber characterized by the fact that the inflow of the bypass current is via connecting holes 107a/107b outside the main stage valve bodies 21a/21b.

Examples of electromagnetic valve arrangements with armatures, and associated components, including ring magnets, which may be utilized in accordance with the embodiments of the present invention, may be found in the following U.S. Patents: U.S. Pat. No. 5,265,703, which issued to Ackermann on Nov. 30, 1993; U.S. Pat. No. 5,180,039, which issued to Axthammer et al. on Jan. 19, 1993; U.S. Pat. No. 4,899,996, which issued to Maassen et al. on Feb. 13, 1990; U.S. Pat. No. 4,850,460, which issued to Knecht et al. on Jul. 25, 1989; and U.S. Pat. No. 4,785,920, which issued to Knecht et al. on Nov. 22, 1988.

Examples of shock absorbers, and components associated therewith, which may be utilized in accordance with the embodiments of the present invention, may be found in the U.S. Patents listed immediately above.

Examples of rotary valve arrangements, and components associated therewith, such as torque motors, which may be utilized in accordance with the embodiments of the present invention, may be found in the following U.S. Patents: U.S. Pat. No. 5,207,774, which issued to Wolfe et al. on May 4, 1993; U.S. Pat. No. 5,160,162, which issued to Mouri et al. on Nov. 3, 1992; U.S. Pat. No. 5,087,868, which issued to Ishibashi et al. on Feb. 11, 1992; U.S. Pat. No. 4,776,437, which issued to Ishibashi et al. on Oct. 11, 1988; and U.S. Pat. No. 4,754,855, which issued to Kuwana et al. on Jul. 5, 1988.

The invention as described hereinabove in the context of the preferred embodiments is not to be taken as limited to all of the provided details thereof, since modifications and variations thereof may be made without departing from the spirit and scope of the invention.

What is claimed is:

1. A shock absorber comprising:

a cylinder defining a chamber therein, said cylinder containing a damping fluid;

a piston rod sealingly projecting into said cylinder and being axially displaceable with respect to said cylinder;

a piston being attached to said piston rod, said piston being slidably disposed within said cylinder to sealingly divide said cylinder into first and second chambers;

means for permitting fluid communication between said first and second chambers;

said means for permitting fluid communication being disposed in at least a portion of said piston, said means for permitting fluid communication comprising:
a first spring-loaded main stage valve body;
a second spring-loaded main stage valve body;
a control chamber being defined between said first main stage valve body and said second main stage valve body;
first inlet means for directing fluid from said first chamber to said control chamber through said first main stage valve body upon axial displacement of said piston in a first direction;
second inlet means for directing fluid from said second chamber to said control chamber through said second main stage valve body upon axial displacement of said piston in a second direction, the second direction being opposite the first direction;
means for permitting axial displacement of said first main stage valve body towards said second main stage valve body during flow of damping fluid through said first inlet means; and
means for permitting axial displacement of said second main stage valve body towards said first main stage valve body during flow of damping fluid through said second inlet means;

said first chamber is a piston-side chamber;

said second chamber is a non piston-side chamber;

said means for permitting fluid communication between said first and second chambers further comprising:
means for dividing the damping medium into a main flow and a bypass flow;
a damping valve device, said damping valve device comprising:
a damping valve body and first and second main stage valves;

said first main stage valve comprising said first main stage valve body;

said second main stage valve comprising said second main stage valve body; and a pilot stage valve configured for activating said first and second main stage valves;

outlet means for directing damping fluid between said control chamber and said first and second chambers; and actuator means for adjustably controlling the flow of damping fluid through said outlet means.

2. Shock absorber according to claim 1, wherein the main flow flows through said first and second main stage valves in both flow directions and the bypass flow flows through said pilot stage valve in both flow directions.

3. Shock absorber according to claims 2, further comprising one of the following sets of features (A, B, C, D, E, F, G):

(A) that inside the damping valve body (7), the bypass flow of damping medium runs through the control chamber (19; 19a; 19b) and the main flow runs through connecting passages (11a; 11b) radially outside the control chamber (19; 19a; 19b), and an antechamber (23) formed by the actuator is oriented concentrically to the control chamber (19; 19a; 19b), whereby between the antechamber (23) and a work chamber (33; 35) there is a connection in at least one flow direction, and thus there is a radial flow connection (25) which is controlled by the actuator between the control chamber (19; 19a; 19b) and the antechamber (23);

(B) that inside the damping valve body (5), at least for one flow direction, the main flow and the bypass flow have a common feed opening (15a; 15b);

(C) that the main stage valve bodies (21a/21b) have throttle holes, through which the bypass flow flows into the control chamber (19/19a/19b);

(D) that the holes to the control chamber (19a/19b) and/or to the antechamber (23/23a/23b) have directionally-dependent transmission valves (103/105/111), which open up a larger throttle cross section in the outflow direction of the respective chambers than in the inflow direction;

(E) that the damping valve device (1) has at least one pressure relief valve;

(F) that the pilot stage valve is always partly open, so that the main stage valve (21a; 21b) simultaneously represents a pressure relief valve; and (G) that the actuator consists of a ring magnet (49) in connection with an axially-movable armature (51).

4. The shock absorber according to claim 3, characterized by the fact that the main stage valve bodies (21a; 21b) are equipped with non-return valves (37a, 37b) which open in the inflow direction of the bypass flow into the control chamber (19; 19a; 19b).

5. The shock absorber according to claim 4, further comprising one of the following sets of features (N,P):

(N) that at least one of the non-return valves (37a; 37b) is formed by an elastically deformable retaining ring; and (P) that the main stage valves have a directionally-dependent damping force characteristic, which are formed by several springs (45a; 45b), whereby all of the springs (45a/45b) are supported on one main stage valve body (21a), and some of the springs (45a; 45b) are engaged on the second main stage valve body, so that the spring forces for the main stage valve body (21a) add up, and for the second main stage valve body (21b) a portion of the spring forces are active.

6. The shock absorber according to claim 5, characterized by the fact that the non-return valves for the main flow have pressure relief valves (73).

7. The shock absorber according to claim 6, characterized by the fact that at least one of the non-return valves for the main flow consists of a non-return valve body (75) pressed by means of a spring (81) against the damping valve body (5), with a connection cross section (77) on both sides of the damping valve body, which in turn is covered by a spring-loaded closing body (79), so that in one flow direction of the main flow, the closing body (79) lifts up from the damping valve body, and in the other direction the non-return valve body (75) lifts up from the damping valve body.

8. The shock absorber according to claim 2, further comprising one of the following sets of features (Q, R, S, T):

(Q) that a hydraulically active valve-opening surfaces of the main stage valve are larger than the valve-closing surfaces;

(R) that the actuator consists of a servomotor in connection with a rotary valve (39);

(S) that a movable armature (51) represents a seat valve; and that inside the armature (51) there is a connecting rod (51c), which has a crown on at least one end, and with a matching opposite surface forms an angle offset equalization; and (T) that the actuator is continuously adjustable.

9. The shock absorber according to claim 8, characterized by the fact that the actuator can be adjusted in stages.

10. The shock absorber according to claim 2, further comprising one of the following sets of features (X,Y,Z):

(X) that the damping valve device (1) has an actuator which has a pressure-equalized actuating element (39; 51);

(Y) that the damping valve device (1) has a two-part control chamber (19), whereby the two parts (19a/19b) of the control chamber are connected by means of the pilot stage valve (39/51a); and (Z) that the inflow of the bypass current is via connecting holes (107a/107b) outside the main stage valve bodies (21a/21b).

11. The shock absorber according to claim 3, characterized by a fact that the pressure control valve releases the bypass flow by lifting a valve body, and bypasses a non-return valve for the control chamber (19).

12. The shock absorber according to claim 3, characterized by the fact that the connection between the antechamber (23) and the control chamber (19; 19a; 19b) represents an advanced opening cross section.

13. The shock absorber according to one of the claim 12, characterized by the fact that the damping valve body (5) comprises a damping valve head body (7) and a damping valve intermediate body (9) on each end.

14. The shock absorber according to claim 13, characterized by the fact that:

the main stage valves (21a; 21b) are centered on a pivot segment (17) corresponding to the piston rod (3); and said shock absorber further comprises one of the following sets of features (V, W):

(V) that the damping valve head body (7) is oriented symmetrically inside the damping valve body (5); and that the damping valve head body (7) and the damping valve intermediate body (9) are combined into a single component, so that the damping body body (5) consists of two identical but symmetrical individual parts; and (W) that a jacket tube (5a) is located concentrically to the damping valve intermediate body (9), and at least one damping valve head body can be displaced relative to the jacket tube before it is fixed to the jacket tube, so that the axial length of the damping valve intermediate body (9) can be adjusted arbitrarily; and that the fastening between the damping valve head body (7) and the jacket tube (5a) is accomplished by means of a plastic deformation.

15. The shock absorber according to claim 1, further comprising one of the following sets of features (H, J, K, L, M):

(H) that the damping valve device (1) is equipped with non-return valves (29a; 29b; 31a; 31b; 37a; 37b) for the main flow and/or the bypass flow, so that for both flow directions of the control chamber (19; 19a; 19b), the damping force adjustment is made by controlling the discharge of the bypass flow between the control chamber (19; 19a; 19b) and the antechamber (23);

(J) that the damping valve device is equipped with non-return valves (19a; 29b; 31a; 31b; 37a; 37b) for the main flow and/or the bypass flow, so that for one flow direction of the control chamber, the damping force is adjusted by controlling the inflow, and for the other flow direction the outflow of the bypass flow between the control chamber (19; 19a; 19b) and the antechamber (23);

(K) that the main stage valves have directionally-dependent damping force characteristics, which are formed by several springs (45a; 45b), whereby the spring (45a) is supported on one main stage valve body (21a) and the spring (45b) is supported on the main stage valve body (21b), whereby both springs (45a; 45b) are engaged alternately on a spring guide sleeve (45c) which is stationary relative to the damping valve intermediate housing (9);

(L) that the damping valve device (1) has two separate control chambers (19a; 19b), whereby the flow passes through a control chamber (19a; 19b) for each flow direction, and the connections between the control chambers (19a; 19b) and the antechamber (23) are controlled by a common actuator, so that overall there are two basic setting ranges of the damping valve device (1), whereby the one achieves a damping force adjustment in the same direction for both flow directions, and the other achieves a damping force adjustment in different directions; and (M) that the damping valve device (1) has two separate control chambers (19a; 19b), whereby the flow passes through a control chamber (19a; 19b) for each flow direction, and the connections between the control chambers (19a; 19b) and the antechamber (23) are controlled by a common actuator, so that for each flow direction of the damping valve device (1) there are at least two different damping force characteristics, which can be set as a function of the actuator position in the same direction or in different directions for the two flow directions.

16. The shock absorber according to claim 15, characterized by the fact that the non-return valves (37a; 37b) for the bypass flows are equipped with pressure relief valves (91); and that a pressure control valve (91) for the bypass flow is located inside the control chamber (19; 19a; 19b), whereby the pressure control valve (91) and at least one of the non-return valves (37a, 37b) are designed as a combination component, and are braced against one another as two valve disc bodies which alternately lift up from their valve Seat surfaces.

17. The shock absorber according to claim 16, characterized by the fact that the main valve body consists of two individual bodies (83; 87), whereby the one body (83) represents the guide body and the other body represents the seat (87).

18. The shock absorber according to claim 1, characterized by the fact that the damping valve device (1) has an emergency operating position which consists of at least one spring system (63), which pushes an armature (51) of the actuator against a contact surface (65), which results in a medium damping force setting.

* * * * *

UNITED STATES PATENT AND TRADEMARK OFFICE
CERTIFICATE OF CORRECTION

PATENT NO. : 5,551,541
DATED : September 3, 1996
INVENTOR(S) : Andreas FÖRSTER

It is certified that error appears in the above-indentified patent and that said Letters Patent is hereby corrected as shown below:

In column 17, line 21, after 'orifice', delete "2f" and insert --21'--.

In column 27, line 1, Claim 14, after 'damping', delete the first occurrence of "body" and insert --valve--.

Signed and Sealed this

Twenty-eighth Day of January, 1997

Attest:

BRUCE LEHMAN

Attesting Officer    Commissioner of Patents and Trademarks